United States Patent [19]

Kale

[11] Patent Number: 4,692,592
[45] Date of Patent: Sep. 8, 1987

[54] COMPARTMENTALIZED ELECTRIC LIQUID HEATER

[76] Inventor: Hemant D. Kale, 5145 N. Kenton Ave., Chicago, Ill. 60630

[21] Appl. No.: 774,049

[22] Filed: Sep. 9, 1985

Related U.S. Application Data

[63] Continuation-in-part of Ser. No. 583,052, Feb. 23, 1984, abandoned.

[51] Int. Cl.⁴ .............................................. F24H 1/14
[52] U.S. Cl. .................................... 219/298; 219/314; 219/320; 219/321
[58] Field of Search ............... 219/298, 306, 314, 320, 219/321

[56] References Cited

U.S. PATENT DOCUMENTS

| | | | |
|---|---|---|---|
| 1,069,679 | 8/1913 | Wallace | 219/321 |
| 1,731,058 | 10/1929 | Pierson | 219/320 |
| 1,850,156 | 3/1932 | Richardson | 219/298 |
| 1,899,839 | 2/1933 | Von Ruden | 219/398 X |
| 2,643,322 | 6/1953 | Lime | 219/314 |
| 2,775,682 | 12/1956 | Hynes | 219/306 |
| 2,825,791 | 3/1958 | Jackson | 219/321 |
| 2,834,865 | 5/1958 | Coates | 219/321 |
| 3,280,299 | 10/1966 | Doniak | 219/306 |
| 3,353,000 | 11/1967 | Tomlinson | 219/321 |
| 3,551,646 | 12/1970 | Harmon | 219/321 |
| 3,586,822 | 6/1971 | Pastore | 219/321 |
| 4,459,465 | 7/1984 | Knight | 219/321 |

FOREIGN PATENT DOCUMENTS

| | | | |
|---|---|---|---|
| 2472144 | 6/1981 | France | 219/306 |
| 1523763 | 9/1978 | United Kingdom | 219/321 |

*Primary Examiner*—John Sipos
*Attorney, Agent, or Firm*—John C. Shepard

[57] ABSTRACT

A compartmentalized storage tank-type electric liquid heater includes a housing with upper and lower portions. A fluid inlet is defined in the lower portion and a fluid outlet is defined in the upper portion. A plurality of panels or other partitioning structures are mounted within the housing to divide the interior into a plurality of subcompartments. A first subcompartment includes a cold water inlet and a final subcompartment includes a hot water outlet. The first and final subcompartments are in fluid communication with a plurality of intermediate subcompartments. All or most subcompartments include a heating element. In one embodiment of the invention, the heating elements in the first and final subcompartments are electrically connected to a first temperature control and the heating elements in the intermediate subcompartments are electrically connected to a second temperature control. Thermostatic controls are arranged to shift energy from one or more upstream compartments to downstream compartments during water usage to achieve a portion of the storage tank capacity at design delivery temperature at a minimum of electrical energy input. When water flow stops, the heating elements in the later compartments stay energized for a period of time until the water reaches a predetermined temperature and then the elements in one or more later (downstream) compartments are at least partially deenergized to shift energy to one or more upstream compartments.

8 Claims, 26 Drawing Figures

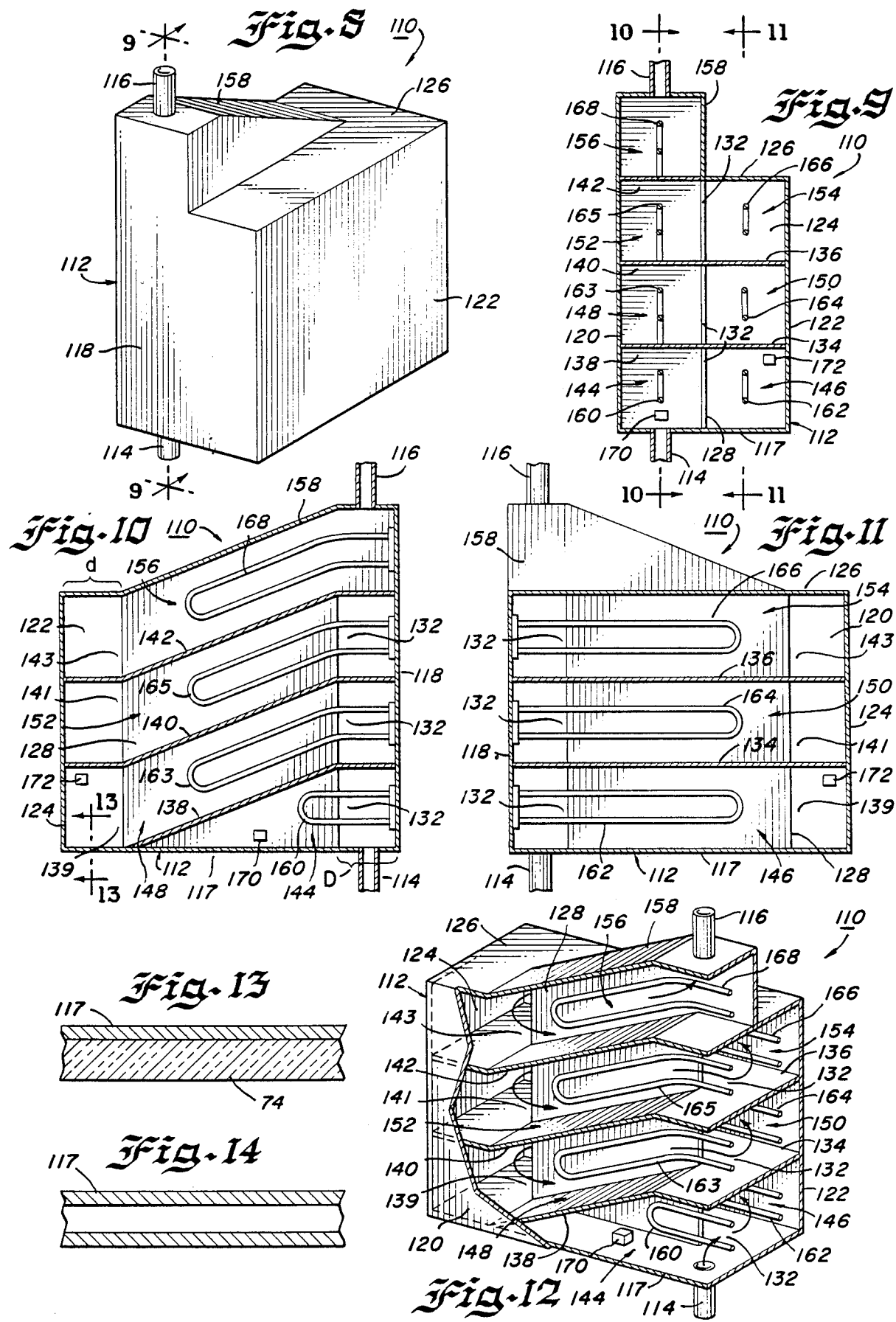

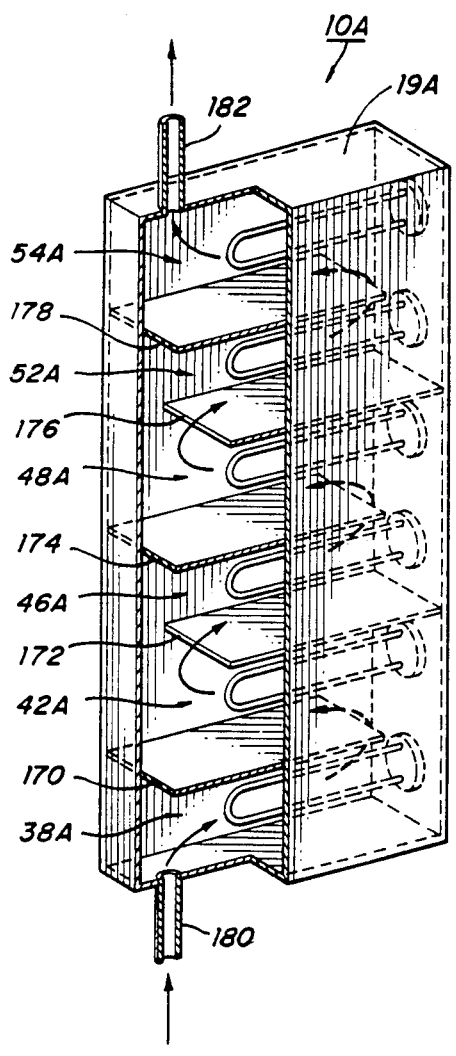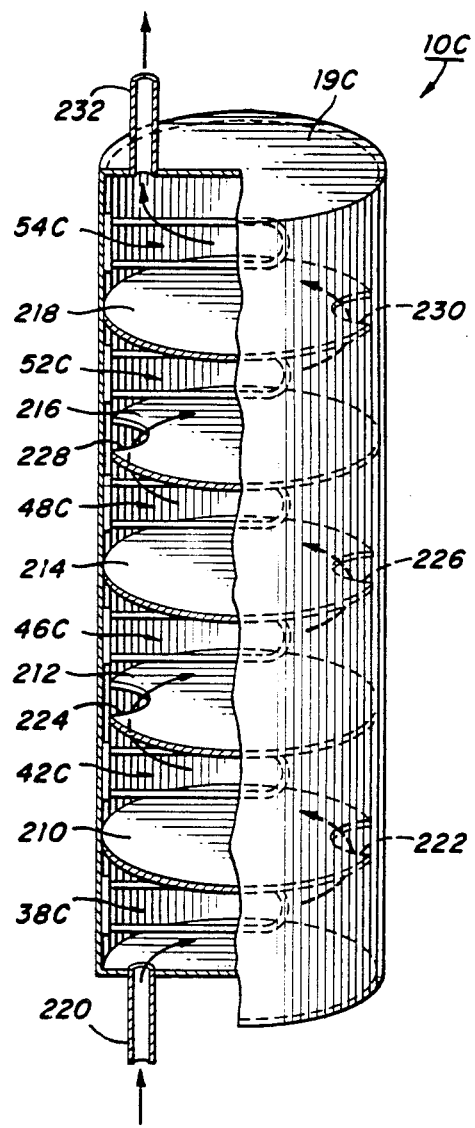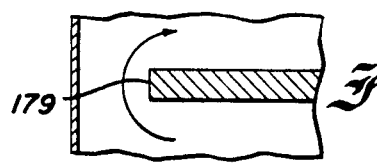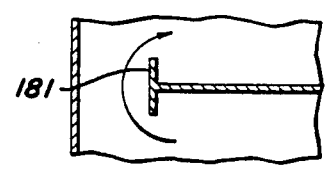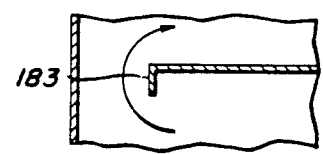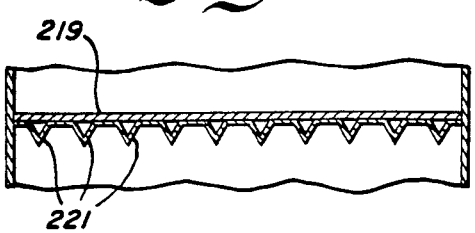

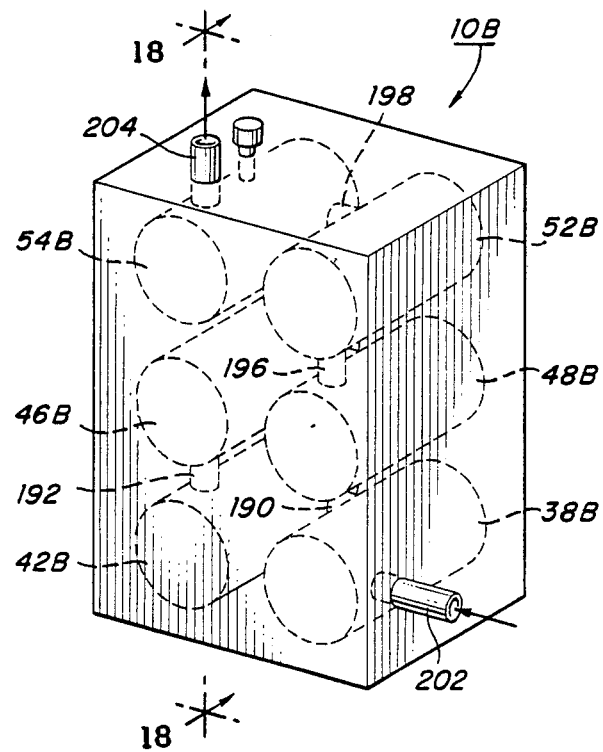
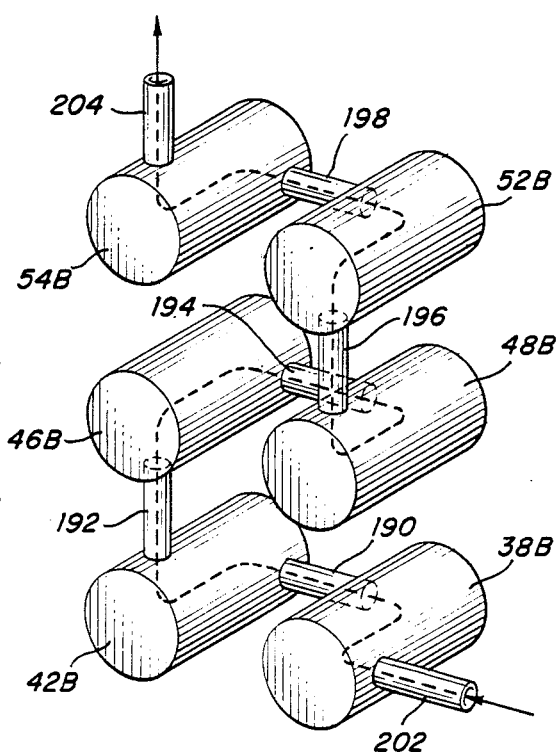
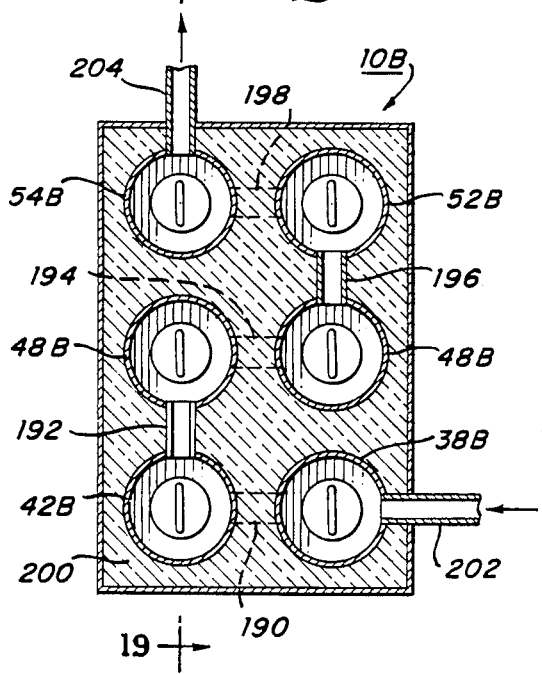
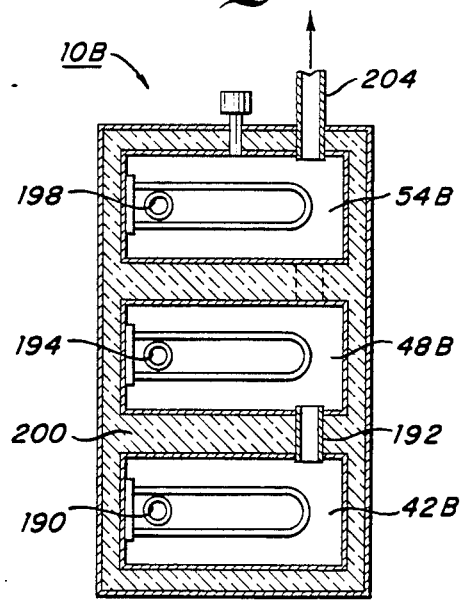

WATTS/ELEMENT = 1900W
TOTAL WATT INPUT = 2×1900 = 3800W

WATTS/ELEMENT = 3800W
TOTAL WATT INPUT = 3800W

COMPARTMENTALIZED ELECTRIC LIQUID HEATER

CROSS REFERENCE TO RELATED APPLICATION

This application is a continuation-in-part of copending application Ser. No. 583,052, filed Feb. 23, 1984 now abandoned.

BACKGROUND OF THE INVENTION

A. Field of the Invention

The present invention relates to a new and improved electric liquid heater and particularly to a new and improved compartmentalized electric water heater that provides substantial energy savings.

B. Description of the Background Art

In prior art domestic water heating tanks a large quantity of water is heated continuously to maintain an entire tank capacity of water at delivery temperature i.e. 140°-160° F. Even when the hot water is not being used, energy must be used to maintain the entire tank capacity of water at delivery temperature by adding energy lost to the atmosphere upon standing. When hot water is used from such prior art hot water tanks, cold water is added directly to the heated water and the cold and hot water mixes freely lowering the delivery temperature of the water. This type of heating by maintaining a large quantity of hot water at delivery temperature regardless of when such hot water will be used, and without regard to the quantity of hot water needed at any particular time is very inefficient and wastes substantial energy which is lost to the surrounding atmosphere at a lower ambient temperature than the water delivery temperature. The present state of the art provides thermal insulation of varying degrees to reduce the energy loss to the atmosphere but does not provide a hot water heater capable of inhibiting uncontrolled, spontaneous mixing of incoming cold water with standing hot water as well or the capability of heating water to its delivery temperature as it approaches the delivery point.

Attempts have been made to reduce the size of hot water heaters while maintaining sufficient capacity by using immersed electric heater elements in place of oil or gas heating. The immersed heating elements provide faster water heating than fossil fuel heating because of the immersion of the heating elements directly in the path of the flowing water. Examples of electric immersion water heaters are disclosed in the Pastore Pat. No. 3,586,822 and in the Swoyer Pat. No. 2,987,604. Another example of an electric immersion hot water heater is disclosed in the Flanders Pat. No. 3,952,181. In accordance with the Flanders patent, one or more of the electric heating elements can be deactivated in accordance with the water demand at any given time. None of these patents have energy savings as their stated objective.

The electric immersion hot water heaters, such as disclosed in the Swoyer and Flanders patents, have not achieved appreciable commercial success, even with controlled deactivation of heating elements, as disclosed in the Flanders patent. It has been determined that one of the basic deficiencies of typical hot water heaters is that the heater structure does not include a relatively long water flow and/or heat conduction path to provide sufficient isolation between the incoming cold water and the outgoing hot water. Without this relative isolation and the long path the heated water freely mixes with the incoming cold water which causes rapid temperature deterioration of the heated water standing in the tank. Due to this free mixing of water, the conventional heaters having compartmentless tanks will deliver only part of the total tank capacity of hot water. The present invention will allow the heater to deliver total tank capacity at design delivery temperature.

SUMMARY OF THE INVENTION

An object of the present invention is to provide a new and improved device for heating liquids, such as water, primarily for domestic use. The device is suitable primarily for any open ended system, that is, water systems wherein hot water, after use, is discharged to drain.

Another object of the present invention is to provide a new and improved economically and practically viable compartmentalized electric water heater that results in substantial energy savings.

Another object of the present invention is to provide a new and improved water heater capable of providing a gradual temperature rise by passing water through successive compartments so that the water is warmest and closest to design delivery temperature when it reaches the final compartment.

Still another object of the present invention is to provide a new and improved heater capable of reduced recovery time for small quantities of water so that in a relatively short time period a portion of the total capacity of the tank can be heated to design delivery temperature.

A still further object of the present invention is to provide a new and improved compartmentalized electric water heater that includes a plurality of interconnected compartments stacked in a plurality of vertical and/or horizontal banks, all or most with an electric immersion heating element.

Another object of the present invention is to provide a new and improved compartmentalized electric water heater that includes a plurality of interconnected compartments having heating elements near the inlet and the outlet of the water heater being controlled independently of other heating elements.

A further object of the present invention is to provide a new and improved compartmentalized electric water heater with structure defining a serpentine path from an inlet to an outlet of the water heater with a plurality of sharp bends in the path to create turbulence enhancing heat transfer between the heating elements and flowing water.

A further object of the present invention is to provide a new and improved compartmentalized electric water heater with structure defining a serpentine U-shaped or spiral path from an inlet to an outlet of the water heater with a plurality of sharp bends in the path to create turbulence enhancing heat transfer between the heating elements and flowing water.

Another object of the present invention is to provide a new and improved heater having a sufficiently long flow path between incoming and outgoing water to substantially inhibit mixing between the incoming and outgoing water.

Another object of the present invention is to provide a new and improved heater having a plurality of heating elements capable of being controlled independently to enable energy input to the heater to be proportional to the hot water demand.

Still another object of the present invention is to provide a new and improved heater having a relatively large heating element surface area in relation to the tank capacity.

Another object of the present invention is to provide a new and improved electric water heater having thermally insulated partitions, e.g. hollow partitions, dividing the water capacity into a plurality of compartments in fluid communication.

A further object of the present invention is to provide a new and improved heater capable of positive water flow over heating element surfaces for rapid heat transfer.

Another object of the present invention is to reduce mineral sedimentation occuring due to boiling of the water in the immediate vicinity of the heating element. This is accomplished by reducing the surface watt density of the elements, which is accomplished by providing a relatively large heating element surface area per cubic foot of heater capacity, which in turn, reduces the operating temperature of the element. In accordance with the present industry standard, the watt density vaires from 75 watts/sq.inch for quality models to 180 watts/sq. inch for economy models. These values will become, respectively, approximately 25 and 60 watts/sq. inch in accordance with a preferred embodiment of the present invention.

Another object of the present invention is to reduce the corrosion of the heating element sheath, this is accomplished by reducing the operating temperature of the heating elements. The corrosion process is enhanced at elevated temperatures.

Another object of the present invention is to provide the interior partition walls relatively structurally weak, i.e. weaker than the exterior tank shell to forces of pressure, so that the whole heater tank is considered as one pressure vessel, and the individual subcompartments need not be considered as separate and independent pressure chambers.

Still another object of the present invention is to provide a new and improved compartmentalized heater having partition walls capable of inhibiting heat transfer through them to such a degree that when water is being drawn from the heater at a desired rate in gallons per minute, a minimum amount of heat transfers through the partition walls, which will, with the heating elements energized, result in a higher temperature in each subsequent compartment, but will allow heat transfer through the partition walls so that when there has been no water drawn from the heater for some period of time, for example a minimum of ½ hour, the temperature in all compartments will be at or near the designed delivery temperature.

Another object of the present invention is to provide a storage tank type liquid heater comprising a plurality of serially connected compartments for directing and heating water from an inlet compartment to an outlet compartment and having a plurality of compartments therebetween and having thermostatic control of heating elements in at least some of the compartments so that energy input can be shifted from one or more upstream compartments to one or more downstream compartments during water flow and once flow has stopped, the reverse occurs by energy input in one or more downstream compartments shifted to one or more upstream compartments.

In one embodiment, the partition walls are constructed non-integrally with the exterior housing so that the partitions can be removed as one unit for maintenance of the heater interior.

Briefly, the present invention is directed to a new and improved water heater that includes an insulated housing with interior partitions defining a plurality of interconnected subcompartments. The housing includes an inlet and an outlet with the inlet in fluid communication with a first subcompartment and the fluid outlet in fluid communication with a second subcompartment. A serpentine path extends through the interior of the housing from the inlet to the outlet. This path includes a plurality of sharp turns that create water turbulence enhancing heat transfer between heating elements mounted in each of the subcompartments and water flowing over the elements. The serpentine path is the longest path practical within the restraints of the housing thereby increasing the exposure of the water to the heating elements.

In accordance with one important embodiment, first and second thermostats are included in the housing. The first thermostat is mounted in the first subcompartment and electrically connected to the heating elements in the first and second subcompartments. A second thermostat is mounted within the housing and is electrically connected to heating elements in the remaining subcompartments. This combination of heating elements and thermostats provides three separate temperature layers of water within the housing. The layer of water nearest the outlet is at the highest temperature whereas the temperatures in the other compartments are at lower temperatures, thereby saving energy.

The compartmentalization of the housing also inhibits energy transfer between different layers of water providing energy savings. The partitions may be thermally insulated further inhibiting energy transfer. Thermal insulation may be accomplished by keeping the partition walls hollow or by use of thermal insulating material. The structure defining the compartments may be a plurality of panels, adjacent panels being attached at opposite ends of the housing, interconnected cylindrical passages disposed within a thermally insulated housing interior, or a spiral ramp. The size and shape of openings through which the fluid communication between compartments is maintained can vary. The flow reversal from one compartment to the next succeeding compartment is important, however, to maintain efficient heat transfer to the water. As water flows through the inlet into the first compartment, the reduction in water temperature actuates the first thermostat, in one embodiment, energizing the heating elements in the first and second compartments. Once the water flow is terminated, the heating elements in the first and second compartments stay energized until the water temperature in the first compartment is elevated to a predetermined level. The thermostat then deenergizes the heating elements.

Since water temperature in the first and second compartments, in one embodiment, is controlled by the first thermostat, the heating elements in the first and second compartments remain on or off for the same length of time. Water in the second compartment is at a higher temperature than water entering the first compartment and water in the second compartment will remain at a higher temperature and closer to the design delivery temperature.

If a large quantity of water is withdrawn from the heater, the second thermostat will energize one or more heating elements in the subcompartments other than the first and second subcompartments. At the same time, the first thermostat will be actuated energizing the elements in the first and second compartments. With all heating elements energized, the full capacity of the water heater will be provided at or near the design delivery temperature. This is possible since the incoming water enters the tank behind hot water and is confined in a manner to inhibit uncontrolled and spontaneous mixing thereby arresting rapid deterioration of water temperature throughout the tank.

BRIEF DESCRIPTION OF THE DRAWINGS

The above and other objects and advantages and novel features of the present invention will become apparent from the following detailed description of preferred embodiments of the invention illustrated in the accompanying drawings wherein:

FIG. 8 is a perspective view of another embodiment of the water heater of the present invention;

FIG. 9 is a vertical cross sectional view of the heater taken along line 9—9 of FIG. 8;

FIG. 10 is a cross-sectional view taken along line 10—10 of FIG. 9;

FIG. 11 is a cross-sectional view taken along line 11—11 of FIG. 9;

FIG. 12 is a partially broken away perspective view of the heater of FIG. 8;

FIGS. 13 and 14 are cross-sectional views of two alternate embodiments of heater walls used in the construction of the heaters of the present invention;

FIG. 15 is a partially broken away perspective view of an alternate embodiment of the heater of the present invention;

FIGS. 15A, 15B and 15C are partially broken away cross-sectional views of three alternate embodiments for heater partition walls constructed in accordance with the present invention;

FIG. 16 is another perspective view of another alternate embodiment of the heater of the present invention;

FIG. 17 is a partial perspective view showing the compartments of the heater of FIG. 16 showing the water flow path in dashed lines;

FIG. 18 is a cross-sectional view taken along line 18—18 of FIG. 16;

FIG. 19 is a cross-sectional view taken along line 19—19 of FIG. 18;

FIG. 20 is a partially broken away perspective view of another embodiment of the heater of the present invention; and FIG. 21 is a broken away cross-sectional view showing another embodiment for the partition walls of the heater of FIG. 20.

DETAILED DESCRIPTION OF A PREFERRED EMBODIMENT

Figure 1:
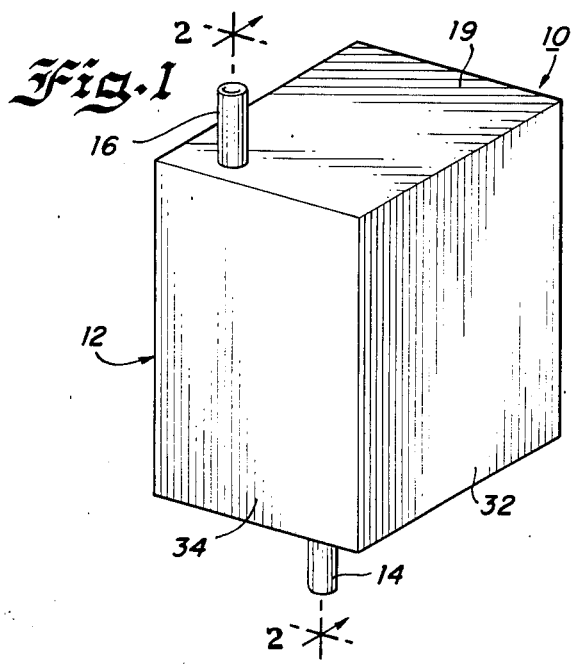
FIG. 1 is a perspective view of a compartmentalized electric water heater constructed in accordance with the principles of the present invention.

Referring to the drawings and initially to FIGS. 1-5 there is illustrated a compartmentalized electric water heater generally designated by the reference numeral 10. Water heater 10 is rectangular; however, any outer configuration is suitable in accordance with the principles of the present invention. Water heater 10 includes a housing generally designated by the reference numeral 12 with an inlet 14 and an outlet 16. Inlet 14 is connected to a source of water while outlet 16 is connected to a conduit requiring heated water such as the hot water plumbing system in a home or commercial establishment. Water heater 10 gradually raises the temperature of water flowing in the inlet 14, heating the water to a desired temperature level prior to delivery through outlet 16.

Housing 12 defines a heater interior volume generally designated by the reference numeral 18 that is divided into a plurality of compartments by panels; however, it is to be understood that structural elements other than panels may be used. A first vertical panel 20 extends between a top wall 19 and bottom wall 21 of housing 12 to divide compartment 18 in half. Four additional panels 22, 24, 26 and 28 are positioned horizontally within compartment 18 extending from vertical panel 20 to sidewalls 30 and 32 of housing 12. the panels 20, 22, 24, 26 and 28 can be made of a suitable thinplate material such as 20 gauge steel, or other suitable material. Generally, a material having a thickness less than about 0.050 inch is satisfactory. A magnesium rod (not shown) or other anti-corrosion device can be disposed within the housing to control corrosion or pitting.

Figure 3:
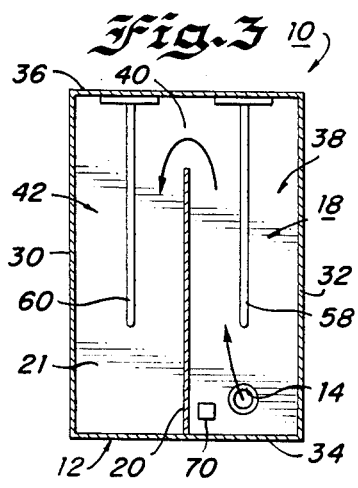
FIG. 3 is a cross-sectional view taken along line 3—3 of FIG. 2.
Figure 4:
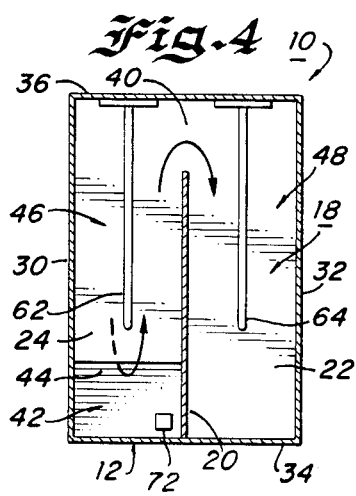
FIG. 4 is a cross-sectional view taken along line 4—4 of FIG. 2.

First panel 22 extends from front wall 34 of housing 12 to rear wall 36 defining a subcompartment 38. Subcompartment 38 is in fluid communication with the inlet 14. Panel 20 extends from forward wall 34 back to, but spaced from, the rear wall 36 to define a gap 40 (FIG. 3). Water entering subcompartment 38 flows around the free end of panel 20 into a second subcompartment 42 defined below panel 24 which extends from rear wall 36 forwardly to but spaced from the front wall 34 to define a gap 44 (FIG. 4). An additional vertical panel (not shown) can be included to provide three vertical banks of compartments thereby providing a longer water flow path.

Water then flows upward through gap 44 into a third subcompartment 46. Subcompartment 46 is defined between horizontal panels 24 and 28, vertical panel 20 and side wall 30. Water in subcompartment 46 flows toward the rear wall 36 through gap 40 into a fourth subcompartment 48. Subcompartment 48 is defined between panels 22 and 26, wall 32 and panel 20. The heater, therefore, includes two vertical and three horizontal banks of compartments.

Figure 5:
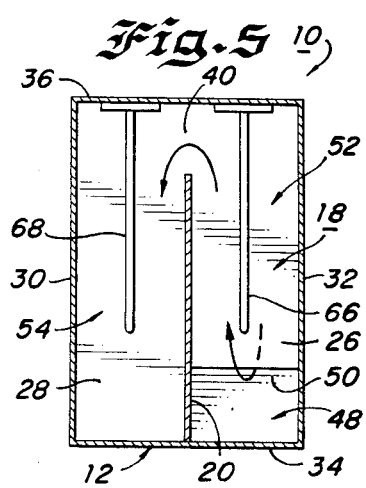
FIG. 5 is a cross-sectional view taken along line 5—5 of FIG. 2.
Figure 6:
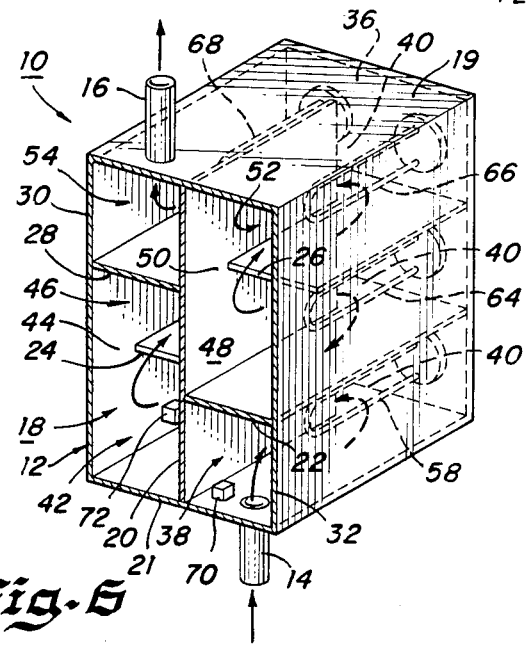
FIG. 6 is a perspective, partially broken away view of the heater of FIG. 1.

Water flows through subcompartment 48 toward the front wall 34 and upwardly through a gap 50 defined between front wall 34 and the forward end of panel 26 (FIG. 5) into a fifth subcompartment 52. Water in fifth subcompartment 52 flows toward rear wall 36, through opening 40, into a sixth subcompartment 54 (FIG. 5)

defined between panel 28 and top wall 19 of housing 12 and between panel 20 and outside wall 30. Water within the sixth subcompartment 54 passes through outlet 16 to an end use.

Panels 20, 22, 24, 26 and 28 not only define subcompartments 38, 42, 46, 48, 52 and 54 but also define a serpentine path from the inlet 14 to the outlet 16 and provide thermal barriers between the subcompartments to maintain temperature stratification between subcompartments. Within each subcompartment 38, 42, 46, 48, 52, and 54 there is an electric heating element 58, 60, 62, 64, 66 and 68, respectively.

To achieve the full advantage of the embodiment of the present invention shown in FIGS. 1-5, the water heater 10 includes at least six subcompartments 38, 42, 46, 48, 52 and 54 in fluid communication including two adjacent vertical banks each having at least three subcompartments. Water flows horizontally through a first subcompartment 38, through a Ushaped conduit to reverse the water flow through a second horizontally adjacent subcompartment 42, then upwardly through a vertical U-shaped conduit into the third horizontal subcompartment 46. The water continues, again reversing flow, through two adjacent intermediate horizontal subcompartments 46 and 48 in countercurrent flow before the water flows upwardly through another vertical U-shaped conduit to flow through the final two horizontally adjacent subscompartments 52 and 54. It has been found that to achieve the full advantage of the embodiment of the present invention shown in FIGS. 1-5, at least six subcompartments provide sufficient temperature stratification when arranged such that the first and final subcompartments are disposed to be separated horizontally as well as vertically by a plurality of subcompartments or elongated water flow channels.

Four intermediate flow channels 42, 46, 48 and 52 between the inlet subcompartment or channel 38 and the outlet subcompartment or channel 68 provide sufficient temperature isolation between the inlet and the outlet subcompartments while achieving outlet water at a desired hot temperature of, for example, 140° F. while reducing the standing hot water volume. In this manner, the energy consumption compared to a typical water heater installed in the home is reduced to about one half.

Water is heated in heater 10 as it flows through the subcompartments 38-54 by passing over the heating elements 58-68. Sharp U-turns in the serpentine path defined by subcompartments 38, 42, 46, 48, 52, and 54 causes reversal of flow and turbulence within the flow path, increasing the rate of heat transfer from heating elements 58, 60, 62, 64, 66 and 68 to the water. The horizontal and vertical flow reversal (countercurrent flow in adjacent horizontal subcompartments, as well as countercurrent flow in adjacent vertical subcompartments) accomplishes the required turbulence to rapidly distribute heat from the heating elements throughout the water in each compartment. Additionally, the incoming cold water enters the tank behind the hot water. The serially connected subcompartments within the housing inhibit free, spontaneous and uncontrolled mixing of this cold water with the standing hot water. This inhibits the temperature deterioration which would take place in the absence of the compartments. In this manner, the water heater can be manufactured having a substantially smaller overall tank capacity while providing sufficient water at a desired temperature for domestic and commercial use.

The flow path defined by subcompartments 38, 42, 46, 48, 52 and 54 provide a sufficiently long flow path between the inlet and the outlet to provide fast water heating while maintaining sufficient separation between the inlet cold water in subcompartment 38 and the outlet hot water in subcompartment 54 and inhibits temperature equalization between inlet and outlet. The horizontal and vertical separation between subcompartments 38 and 54 is very important so that a relatively small quantity of water heated to delivery temperature (a maximum of 1/6 of the total tank capacity) in subcompartment 54 is not rapidly mixed with relatively cooler water in subcompartments 38, 42, 46, 48 and 52. This concept is completely different from the known hot water heaters since such heaters must maintain a constant large quantity of water at delivery temperature, thereby wasting considerable heat when the hot water is not being used.

Figure 2:
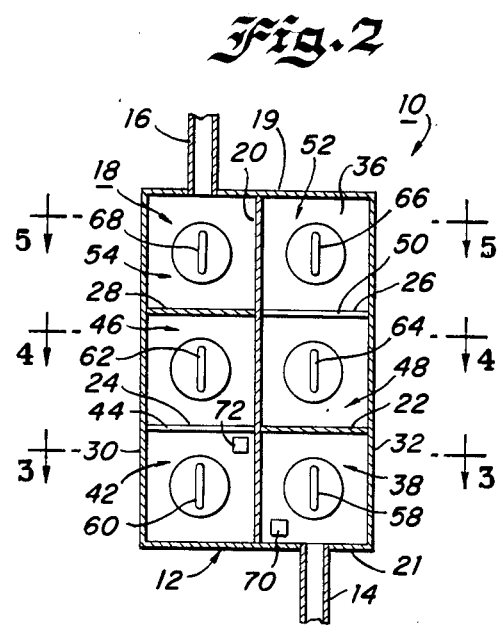
FIG. 2 is a vertical cross-sectional view of the heater taken along line 2—2 of FIG. 1.
Figure 7:
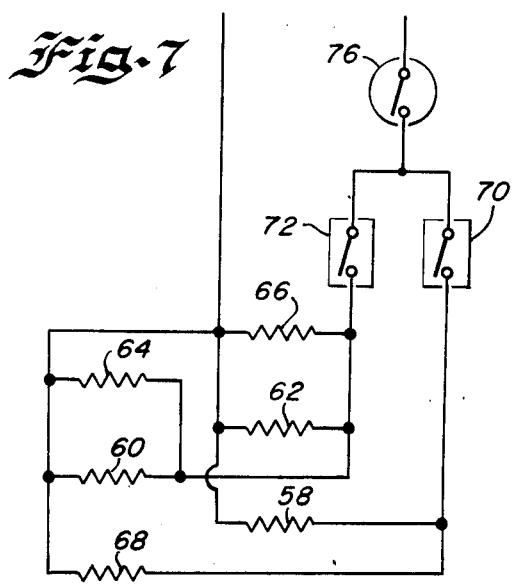
FIG. 7 is a schematic illustration of an electric circuit for any of the electric water heaters shown in FIGS. 1-6 and 8-21.

As illustrated in FIG. 7, heating elements 58 and 68 are electrically connected to a thermostat 70. As illustrated in FIG. 2, thermostat 70 is positioned within subcompartment 38 adjacent inlet 14. The remaining heating elements 60, 62, 64 and 66 are controlled by a second thermostat 72 mounted within subcompartment 42 (FIGS. 2, 4, 6, and 7). As water is drawn from heater 10, cold water enters subcompartment 38 through inlet 14. As this occurs, thermostat 70 closes energizing electric heating elements 58 and 68. Upon termination of water flow, elements 58 and 68 remain energized until water in subcompartment 38 heats to a predetermined temperature, set by thermostat 70. In one embodiment, heating elements 58 and 68 are energized or deenergized for the same length of time. Since water entering subcompartment 54 is at a higher temperature than water entering subcompartment 38, water in compartment 54 will be heated to the delivery temperature prior to deenergization of element 68.

If a large quantity of water is drawn from water heater 10, second thermostat 72 will close energizing the remaining heating elements 60, 62, 64, and 66. As water flows from inlet 14 to outlet 16, it passes over each heating element 58-68 each of which is energized thereby quickly increasing the temperature of the water. At outlet 16 the water is at delivery temperature level. When water is not being withdrawn from heater 10, colder water in lower subcompartments is separated from the hotter water inthe upper subcompartments inhibiting uncontrolled and spontaneous mixing of cold water with hot water.

The location of the controls and the particular circuit used to control the energization and deenergization of the heating elements can be modified to provide controlled heating in any one or more or all of the subcompartments 38, 42, 46, 48, 52 and 54. The thermostatic control and the use and location of thermostats described with respect to any one of the FIGS. 1-24 can be applied to any one of the heaters shown in any FIGS. 1-24.

Referring to FIG. 7 a high temperature pressure safety switch 76 is connected to the electrical heating element wiring for safety purposes. Switch 76 will open and deenergize all of the heating elements 60-68 if an undesirable high temperature is reached within water heater 10. Alternatively and/or additionally, a pressure relief valve (not shown) can be included in the housing for safety.

Turning now to FIGS. 8-11, there is illustrated an alternative compartmentalized electric water heater generally designated by the reference numeral 110. Water heater 110 includes a housing 112 with a water inlet 114 and a water outlet 116. Housing 112 is defined by a bottom wall 117, a front wall 118, sidewalls 120 and 122, a rear wall 124 and a top wall 126.

Electric water heater 110 includes a plurality of subcompartments best illustrated in FIGS. 8–11. The subcompartments are each defined by a vertical wall 128 extending between the top wall 126 and bottom wall 117. Wall 128 is spaced a distance D (FIG. 10) from front wall 118 and a distance d from the rear wall 124. A pair of horizontal panels 134 and 136 extend from the front wall 118 to the rear wall 124. Three inclined planes or ramps 138, 140 and 142 define paths at different levels within the housing 112.

A first compartment 144 is defined beneath ramp 138 adjacent inlet 114. Water flowng from inlet 114 enters subcompartment 144 and flows around vertical wall 128 through right angle flow path 132 into a second subcompartment 146. Water flows from subcompartment 146 around right angle flow path up ramp 138 to a third subcompartment 148. The water then flows from subcompartment 148 through space 132 around the wall 128 and into a fourth subcompartment 150. The water continues from the subcompartment 150 around right angle flow path 141 up ramp 140 into a fifth subcompartment 152. Water continues flowing through flow path 132 into a sixth subcompartment 154. Water then flows through right angle flow path 143 into a subcompartment 156 defined along ramp 142 leaving heater 110 through outlet 116. Subcompartment 156 is housed within a ramp extension 158 in the top 126 of housing 110.

A spiral serpentine path between the inlet 114 and the outlet 116 is defined within the housing 112. Heating elements 160, 162, 163, 164, 165, 166 and 168 similar to heating elements 58–68 in heater 10 are positioned in each of the subcompartments. Heating elements 160 and 168 in compartments 144 and 156 are controlled by a single thermostat 170 while the remaining heating elements 162–166 are controlled by a single thermostat 172 such that water flowing through heater 110 is heated in the same way as in water heater 10.

Temperature insulation of water in the different subcompartments is provided by insulating the panels and walls. The walls and panels, 142 (for example), may be hollow using trapped air as insulation (FIG. 14) or they may be insulated with, for example, polyurethane foam insulation 74 (FIG. 13) applied to panel or wall layer 301.

Turning now to FIG. 15, a heater, designated generally by reference numeral 10A includes a plurality of vertical subcompartments 38A, 42A, 46A, 48A, 52A and 54A, corresponding generally to subcompartments 38, 42, 46, 48 and 52 of heater 10 (see FIG. 2), except that all subcompartments of the heater 10A are in a single vertical array. The subcompartments are defined by partitions 370, 372, 374, 376 and 378 and sheet metal rectangular housing 19A.

The partitions may be provided with neck forms, e.g. insulated neck 179, FIG. 15A; T-shaped neck 181, FIG. 15B; or L-shaped neck 183, as shown in FIG. 15C to obtain a still longer water flow path between inlet 180 and outlet 182. Water enters the heater 10A through cold water inlet 180 in subcompartment 38A and travels the length of subcompartment 38A before travelling upwardly around a free end of partition 370 into subcompartment 42A. The water entering subcompartment 42A travels the entire length of subcompartment 42A in a travel direction opposite to that in the adjacent lower subcompartment 38A and proceeds upwardly around a free end of partition 372 to enter subcompartment 46A for travel in a direction opposite to the travel direction in the next lower subcompartment 42A. This same upward flow, reversing direction in each higher subcompartment continues through the remaining subcompartments 48A, 52A, and 54A, and the heated water exits the final subcompartment 54A through hot water outlet 182.

In accordance with another embodiment of the present invention, another new and improved heater, designated by reference numeral 10B, is described with reference to FIG. 16. The individual compartments of heater 10B are formed from separate, independent main water heating conduits or flow passages defining subcompartments 38B, 42B, 46B, 48B, 52B and 54B interconnected by conduits 190, 192, 194, 196, and 198 of substantially smaller cross sectional area than the cross sectional area of the main water heating conduits. The main water heating flow passages or subcompartments 38B, 42B, 46B, 48B, 52B and 54B are shown cylindrical or tubular in shape, but may be any other shape, e.g. rectangular, triangular, annular or the like and may include various bends, e.g. a spiral or turning cylinder, to enhance turbulence during heating. The main flow passages 38B, 42B, 46B, 48B, 52B and 54B and the interconnecting conduits 190, 192, 194, 196, and 198 are confined within a sheet metal housing 19B. In accordance with an important feature of this embodiment of the invention, the housing is filled with a suitable insulation material, for example, polyurethane foam 200, surrounding all main heating passages and conduits. The surrounding insulation 200, smaller cross sectional conduits 190, 192, 194, 196 and 198, and housing 10B substantially inhibit heat transfer from one main flow passage to an adjacent flow passage and to the atmosphere.

Water enters the heater 10B through cold water inlet 202 in the first subcompartment 38B and travels the length of subcompartment 38B before travelling horizontally through smaller diameter conduit 190 into subcompartment 42B. Water entering subcompartment 42B travels the entire length of subcompartment 42B in a travel direction opposite to that in subcompartment 38B before travelling through smaller diameter conduit 192 into subcompartment 46B. The water entering subcompartment 46B travels the entire length of subcompartment 46B in a travel direction opposite to that in subcompartment 42B and proceeds through smaller diameter conduit 194 into subcompartment 48B. This same flow reversal continues through subcompartments 52B and 54B through hot water outlet 204.

Turning now to FIG. 20, a heater, designated generally by reference numeral 10C includes a plurality of vertical subcompartments 38C, 42C, 46C, 48C, 52C and 54C, corresponding generally to subcompartments 38, 42, 46, 48 and 52 of heater 10 (see FIG. 2), except that all subcompartments of the heater 10C are cylindrical and in single vertical array. The subcompartments are defined by circular partitions 210, 212, 214, 216, and 218 and sheet metal cylindrical housing 19C. The partitions may be insulated to varying degrees by providing varying amounts of hollow portions in any form, shape or size, for example, as shown in FIG. 21, to match the design conditions. Further, it should be borne in mind that the normal occurence of mineral sedimentation will leave a layer of deposits on the partition walls. The thermal insulation provided by this layer may in itself be adequate. In accordance with the embodiment shown in FIG. 21, partitions 219 include, a plurality of V-shaped longitudinally and downwardly extending turbulence inducing baffles 221.

Water enters the heater 10C through cold water inlet 220 in subcompartment 38C and travels the vertical and horizontal dimensions of subcompartment 38C before travelling upwardly through a generally circular opening 222 in partition 210, disposed opposite the inlet 220, into subcompartment 42C. The water entering subcompartment 42C travels the entire vertical and horizontal dimensions of subcompartment 42C in a travel direction opposite to that in the adjacent lower subcompartment 38C and proceeds upwardly around a generally circular opening or flow passage 224 in partition 212 to enter subcompartment 46C for travel in a direction opposite to the travel direction in the next lower subcompartment 42C. This same upward flow, reversing direction in each higher subcompartment continues through the remaining subcompartments 48C, 52C, and 54C, and through flow openings 226, 228 and 230 and the heated water exits the final subcompartment 54C through hot water outlet 232. The flow openings 224, 226, 228 and 230 etc. may be positioned between 90 to 180 degrees from the preceding partition opening to provide swirling motion to the water between the inlet and outlet.

In order to show the new and unexpected efficiency of the compartmentalized heaters of the present invention, a heater was manufactured, as shown in FIG. 15, using five hollow, rectangular ½ inch thick partitions, adjacent partitions being open at opposite ends-leaving 3 inch rectangular water passages between the end of each partition and the interior walls of the heater. The overall dimensions of the heater are as follows: 3 feet tall, 17½ inches long, and 6 inches wide. The heater has a capacity of about 15 gallons and has an external surface area of 13.2 ft.$^2$. Six heating elements are provided, one in each compartment, as shown in FIG. 15. Each partition has dimensions of 14½ inches long, 6 inches wide and ½ inch thick. Each compartment is about 6 inches in height. Only one regulating thermostat is provided, approximately mid way between the second and third heating elements, near one side wall of the heater. The heater is insulated on the exterior walls with ½ inch of fiberglass insulation.

For comparison purposes, the above-described heater, manufactured in accordance with the present invention was compared to a Sears 30 gallon capacity POWER-MISER conventional non-compartmentalized heater.

DEGREE-GALLON TEST PROCEDURE

Before starting each test, the test heater and Sears heater were flushed continuously for 1 hour by allowing the water to run through the heaters with the heater not energized. For each heater, the test procedure was as follows:

The water flow was shut off, the heater energized, the volts & amps, inlet water temperature and the time recorded. The heater operation was allowed to continue until the heater was turned off the internal (integral) thermostat. The time at this point was recorded. Soon after, a regulating valve was set to the the desired "open" setting and the water flow was started by turning an outlet valve. The discharge water temperature was recorded at each 5 second interval until the temperature fell to 100° F. At this point, the outlet valve was swiftly turned off. The height of the water collected in the collection basin was recorded and converted to gallons. Additionally, the time when the heater was turned on by the heater thermostat during this period (due to falling water temp.) was also recorded.

The test was repeated at various settings of the regulating valve and calculated using the following formulas:

"Degree-Gallons" $= Q \times (T_1 - T_o)$ where
$Q$ = Quantity in gallons of water drawn
$T_1$ = Temperature in Deg. F. of water drawn
$T_o$ = Temperature of inlet water The degree-gallons were calculated for every period during which the water temperature dropped by 1 Deg. F. but not for a period of less than 5 seconds.

Example — Degree-Gallons $= \left(.751 \times \dfrac{40}{60}\right) \times (168 - 56)$ $= 56.07$ where .751 is water drawn in *GPM*

This example corresponds to the first reading under "Degree-Gallons Output Data" of the first test below. "Total Degree-Gallon Output" = sum of each "Degree-Gallon" output until output water temperature reached 100 Degrees F.

"Degree-Gallons/KW" = Total Degree-Gallon Output/Total KW input to the heater which includes KWs added to the heater before the water was drawn, as well as during the water draw.

"Degree-Gallons/KW/sq.ft"—Degree-Gallons per KW/external Tank Surface Area in Sq. Ft.

"Percentage of Capacity Delivered" = Total Gallons Collected/Gallon Capacity Of The Tank.

The following data were collected:

GPM...... .751

```
WATER HEIGHTS. In. ...9 1/2 & 2 1/4        TOTAL ELAPSED TIME
WATER INLET TEMP. DEG F... 56                 (MIN.S:SEC.S)... 23 : 5
TOTAL GALLONS COLLECTED... 17.3363         INPUT AMPS/VOLTS... 15 / 242
TOTAL EXT. SURFACE AREA (SQ.FT)= 13.2      TOTAL INPUT KW.... 3.947
```

INPUT DATA

| TIME | :5 | :10 | :15 | :20 | :25 | :30 | :35 | :40 | :45 | :50 | :55 | :60 |
|---|---|---|---|---|---|---|---|---|---|---|---|---|
| 0: TEMP | 168 | 168 | 168 | 168 | 168 | 168 | 168 | 168 | 167 | 167 | 166 | 165 |
| 1: TEMP | 165 | 164 | 164 | 163 | 162 | 160 | 159 | 156 | 154 | 152 | 150 | 149 |
| 2: TEMP | 147 | 144 | 144 | 141 | 140 | 140 | 140 | 140 | 139 | 139 | 139 | 138 |
| 3: TEMP | 138 | 137 | 137 | 137 | 137 | 137 | 137 | 137 | 137 | 137 | 137 | 137 |
| 4: TEMP | 137 | 136 | 136 | 136 | 136 | 136 | 136 | 136 | 136 | 136 | 136 | 136 |
| 5: TEMP | 136 | 136 | 136 | 136 | 136 | 136 | 136 | 136 | 136 | 136 | 136 | 136 |
| 6: TEMP | 136 | 136 | 136 | 136 | 136 | 136 | 136 | 136 | 136 | 136 | 136 | 136 |
| 7: TEMP | 136 | 136 | 136 | 136 | 136 | 136 | 136 | 136 | 136 | 136 | 136 | 136 |
| 8: TEMP | 136 | 136 | 136 | 136 | 136 | 136 | 136 | 136 | 136 | 136 | 137 | 137 |
| 9: TEMP | 137 | 137 | 137 | 137 | 137 | 137 | 137 | 137 | 137 | 137 | 137 | 137 |
| 10: TEMP | 137 | 137 | 137 | 137 | 137 | 137 | 137 | 137 | 137 | 137 | 137 | 137 |
| 11: TEMP | 137 | 137 | 137 | 138 | 138 | 138 | 138 | 138 | 138 | 138 | 138 | 138 |
| 12: TEMP | 138 | 138 | 137 | 137 | 137 | 137 | 138 | 138 | 138 | 138 | 138 | 138 |
| 13: TEMP | 138 | 138 | 138 | 138 | 137 | 137 | 137 | 137 | 137 | 137 | 137 | 137 |
| 14: TEMP | 137 | 137 | 137 | 137 | 137 | 137 | 137 | 137 | 137 | 137 | 137 | 137 |
| 15: TEMP | 136 | 136 | 136 | 136 | 136 | 136 | 136 | 136 | 136 | 136 | 136 | 135 |
| 16: TEMP | 135 | 135 | 135 | 135 | 135 | 135 | 134 | 134 | 134 | 134 | 135 | 135 |
| 17: TEMP | 135 | 135 | 132 | 132 | 132 | 132 | 132 | 132 | 130 | 130 | 129 | 129 |
| 18: TEMP | 128 | 127 | 127 | 127 | 126 | 125 | 125 | 124 | 123 | 123 | 122 | 121 |

| TIME: | 19:5 | 19:10 | 19:15 | 19:20 | 19:25 | 19:30 | 19:35 | 19:40 | 19:45 | 19:50 | 19:55 | 19:60 |
|---|---|---|---|---|---|---|---|---|---|---|---|---|
| TEMP: | 121 | 120 | 120 | 119 | 119 | 118 | 118 | 117 | 116 | 116 | 115 | 114 |

| TIME: | 20:5 | 20:10 | 20:15 | 20:20 | 20:25 | 20:30 | 20:35 | 20:40 | 20:45 | 20:50 | 20:55 | 20:60 |
|---|---|---|---|---|---|---|---|---|---|---|---|---|
| TEMP: | 114 | 113 | 113 | 112 | 111 | 111 | 111 | 110 | 109 | 109 | 108 | 108 |

| TIME: | 21:5 | 21:10 | 21:15 | 21:20 | 21:25 | 21:30 | 21:35 | 21:40 | 21:45 | 21:50 | 21:55 | 21:60 |
|---|---|---|---|---|---|---|---|---|---|---|---|---|
| TEMP: | 108 | 108 | 107 | 107 | 107 | 106 | 105 | 105 | 104 | 104 | 103 | 103 |

| TIME: | 22:5 | 22:10 | 22:15 | 22:20 | 22:25 | 22:30 | 22:35 | 22:40 | 22:45 | 22:50 | 22:55 | 22:60 |
|---|---|---|---|---|---|---|---|---|---|---|---|---|
| TEMP: | 103 | 102 | 102 | 102 | 101 | 101 | 101 | 101 | 100 | 100 | 100 | 100 |

DEGREE-GALLONS OUTPUT DATA:

| I | TIME | T(I) | DG(I) | I | TIME | T(I) | DG(I) | I | TIME | T(I) | DG(I) |
|---|---|---|---|---|---|---|---|---|---|---|---|
| 1 | 0:40 | 168 | 56.8747 | 2 | 0:50 | 167 | 13.8933 | 3 | 0:55 | 166 | 6.80417 |
| 4 | 1:5 | 165 | 13.6432 | 5 | 1:15 | 164 | 13.518 | 6 | 1:20 | 163 | 6.69642 |
| 7 | 1:25 | 162 | 6.63383 | 8 | 1:30 | 160 | 6.58867 | 9 | 1:35 | 159 | 6.44508 |
| 10 | 1:40 | 156 | 6.25833 | 11 | 1:45 | 154 | 6.13317 | 12 | 1:50 | 152 | 6.008 |
| 13 | 1:55 | 150 | 5.88283 | 14 | 2:0 | 149 | 5.82925 | 15 | 2:5 | 147 | 5.69508 |
| 16 | 2:15 | 144 | 11.0147 | 17 | 2:20 | 141 | 5.31958 | 18 | 2:40 | 140 | 21.028 |
| 19 | 2:45 | 139 | 5.19442 | 20 | 3:5 | 138 | 20.5273 | 21 | 4:5 | 137 | 60.831 |
| 22 | 4:40 | 138 | 33.8467 | 23 | 5:25 | 135 | 34.3849 | 24 | 8:45 | 136 | 198.253 |
| 25 | 11:15 | 137 | 152.878 | 26 | 12:10 | 138 | 36.4582 | 27 | 12:30 | 137 | 20.277 |
| 28 | 13:20 | 138 | 51.3183 | 29 | 15:0 | 137 | 101.385 | 30 | 15:55 | 136 | 55.0733 |
| 31 | 16:30 | 135 | 34.6066 | 32 | 16:50 | 134 | 19.826 | 33 | 17:10 | 133 | 19.2757 |
| 34 | 17:40 | 132 | 28.538 | 35 | 17:50 | 130 | 9.26233 | 36 | 17:55 | 129 | 4.56858 |
| 37 | 18:5 | 129 | 9.13717 | 38 | 18:20 | 127 | 13.3383 | 39 | 18:25 | 126 | 4.39063 |
| 40 | 18:35 | 125 | 8.6353 | 41 | 18:40 | 124 | 4.25367 | 42 | 18:50 | 123 | 8.30617 |
| 43 | 18:55 | 122 | 4.135 | 44 | 19:5 | 121 | 8.13583 | 45 | 19:15 | 120 | 8.01967 |
| 46 | 19:25 | 119 | 7.8853 | 47 | 19:35 | 118 | 7.76833 | 48 | 19:40 | 117 | 3.81758 |
| 49 | 19:50 | 116 | 7.51 | 50 | 19:55 | 115 | 3.65242 | 51 | 20:5 | 114 | 7.25967 |
| 52 | 20:15 | 113 | 7.1345 | 53 | 20:20 | 112 | 3.58467 | 54 | 20:25 | 111 | 18.3253 |
| 55 | 20:40 | 110 | 3.3795 | 56 | 20:50 | 109 | 6.65383 | 57 | 21:10 | 108 | 13.0173 |
| 58 | 21:25 | 107 | 9.57323 | 59 | 21:30 | 106 | 3.12917 | 60 | 21:40 | 105 | 6.13317 |
| 61 | 21:50 | 104 | 6.008 | 62 | 22:5 | 103 | 8.8243 | 63 | 22:20 | 102 | 8.6365 |
| 64 | 22:40 | 101 | 11.253 | 65 | 22:60 | 100 | 11.0147 | 66 | 999:0 | 0 | 0 |

```
                       GPM....  .751
TOTAL TIME IN SEC.S= 1380
TOTAL OUTPUT IN DEGREE/GALLONS (100 DEG DATUM)= 1336.97
TOTAL OUTPUT IN DEGREE-GALLONS/KW= 338.73
TOTAL OUTPUT IN DEGREE-GALLONS/KW/SQ.FT= 25.6614

GPM......  1.297

WATER HEIGHTS, In. ...9 & 2          TOTAL ELAPSED TIME
         WATER INLET TEMP. DEG F... 57           (MIN.S:SEC.S)... 12 : 25
         TOTAL GALLONS COLLECTED...16.1       INPUT AMPS/VOLTS... 15.4 / 248
         TOTAL EXT. SURFACE AREA (SQ.FT)= 13.2  TOTAL INPUT KW.... 3.817
```

INPUT DATA

| TIME: | 0:5 | 0:10 | 0:15 | 0:20 | 0:25 | 0:30 | 0:35 | 0:40 | 0:45 | 0:50 | 0:55 | 0:60 |
|---|---|---|---|---|---|---|---|---|---|---|---|---|
| TEMP: | 173 | 173 | 172 | 172 | 172 | 171 | 170 | 170 | 169 | 168 | 164 | 157 |

| TIME: | 1:5 | 1:10 | 1:15 | 1:20 | 1:25 | 1:30 | 1:35 | 1:40 | 1:45 | 1:50 | 1:55 | 1:60 |
|---|---|---|---|---|---|---|---|---|---|---|---|---|
| TEMP: | 155 | 155 | 152 | 151 | 149 | 147 | 146 | 145 | 143 | 143 | 141 | 141 |

| TIME: | 2:5 | 2:10 | 2:15 | 2:20 | 2:25 | 2:30 | 2:35 | 2:40 | 2:45 | 2:50 | 2:55 | 2:60 |
|---|---|---|---|---|---|---|---|---|---|---|---|---|
| TEMP: | 140 | 140 | 140 | 140 | 140 | 139 | 139 | 139 | 139 | 139 | 139 | 139 |

| TIME: | 3:5 | 3:10 | 3:15 | 3:20 | 3:25 | 3:30 | 3:35 | 3:40 | 3:45 | 3:50 | 3:55 | 3:60 |
|---|---|---|---|---|---|---|---|---|---|---|---|---|
| TEMP: | 139 | 139 | 139 | 139 | 140 | 140 | 140 | 140 | 140 | 140 | 140 | 139 |

| TIME: | 4:5 | 4:10 | 4:15 | 4:20 | 4:25 | 4:30 | 4:35 | 4:40 | 4:45 | 4:50 | 4:55 | 4:60 |
|---|---|---|---|---|---|---|---|---|---|---|---|---|
| TEMP: | 139 | 139 | 139 | 139 | 138 | 138 | 137 | 137 | 137 | 137 | 136 | 136 |

| TIME: | 5:5 | 5:10 | 5:15 | 5:20 | 5:25 | 5:30 | 5:35 | 5:40 | 5:45 | 5:50 | 5:55 | 5:60 |
|---|---|---|---|---|---|---|---|---|---|---|---|---|
| TEMP: | 136 | 136 | 136 | 136 | 136 | 136 | 136 | 136 | 136 | 136 | 136 | 136 |

| TIME: | 6:5 | 6:10 | 6:15 | 6:20 | 6:25 | 6:30 | 6:35 | 6:40 | 6:45 | 6:50 | 6:55 | 6:60 |
|---|---|---|---|---|---|---|---|---|---|---|---|---|
| TEMP: | 136 | 136 | 136 | 136 | 136 | 137 | 137 | 137 | 137 | 137 | 136 | 136 |

| TIME: | 7:5 | 7:10 | 7:15 | 7:20 | 7:25 | 7:30 | 7:35 | 7:40 | 7:45 | 7:50 | 7:55 | 7:60 |
|---|---|---|---|---|---|---|---|---|---|---|---|---|
| TEMP: | 136 | 136 | 136 | 135 | 135 | 135 | 135 | 135 | 135 | 135 | 135 | 135 |

| TIME: | 8:5 | 8:10 | 8:15 | 8:20 | 8:25 | 8:30 | 8:35 | 8:40 | 8:45 | 8:50 | 8:55 | 8:60 |
|---|---|---|---|---|---|---|---|---|---|---|---|---|
| TEMP: | 135 | 136 | 136 | 136 | 135 | 135 | 135 | 134 | 134 | 134 | 135 | 132 |

| TIME: | 9:5 | 9:10 | 9:15 | 9:20 | 9:25 | 9:30 | 9:35 | 9:40 | 9:45 | 9:50 | 9:55 | 9:60 |
|---|---|---|---|---|---|---|---|---|---|---|---|---|
| TEMP: | 133 | 132 | 132 | 131 | 131 | 130 | 129 | 128 | 127 | 127 | 126 | 125 |

| TIME: | 10:5 | 10:10 | 10:15 | 10:20 | 10:25 | 10:30 | 10:35 | 10:40 | 10:45 | 10:50 | 10:55 | 10:60 |
|---|---|---|---|---|---|---|---|---|---|---|---|---|
| TEMP: | 125 | 125 | 124 | 124 | 123 | 123 | 122 | 121 | 119 | 118 | 118 | 117 |

| TIME: | 11:5 | 11:10 | 11:15 | 11:20 | 11:25 | 11:30 | 11:35 | 11:40 | 11:45 | 11:50 | 11:55 | 11:60 |
|---|---|---|---|---|---|---|---|---|---|---|---|---|
| TEMP: | 115 | 115 | 114 | 112 | 111 | 111 | 109 | 108 | 107 | 107 | 105 | 104 |

| TIME: | 12:5 | 12:10 | 12:15 | 12:20 | 12:25 | 12:30 | 12:35 | 12:40 | 12:45 | 12:50 | 12:55 | 12:60 |
|---|---|---|---|---|---|---|---|---|---|---|---|---|
| TEMP: | 103 | 102 | 102 | 101 | 98 | 0 | 0 | 0 | 0 | 0 | 0 | 0 |

DEGREE-GALLONS OUTPUT DATA:

| I | TIME | T(I) | DG(I) | I | TIME | T(I) | DG(I) | I | TIME | T(I) | DG(I) |
|---|---|---|---|---|---|---|---|---|---|---|---|
| 1 | 0:10 | 173 | 23.8753 | 2 | 0:25 | 172 | 37.200 | 3 | 0:30 | 171 | 12.3215 |
| 4 | 0:40 | 170 | 24.4200 | 5 | 0:45 | 169 | 12.1853 | 6 | 0:50 | 163 | 11.673 |
| 7 | 0:55 | 164 | 11.3640 | 8 | 0:60 | 157 | 18.8003 | 9 | 1:5 | 155 | 18.7082 |
| 10 | 1:10 | 155 | 18.3522 | 11 | 1:15 | 152 | 18.2679 | 12 | 1:20 | 151 | 18.1539 |
| 13 | 1:25 | 149 | 9.94357 | 14 | 1:30 | 147 | 9.7273 | 15 | 1:33 | 146 | 9.61942 |
| 16 | 1:40 | 145 | 9.51133 | 17 | 1:40 | 143 | 18.5983 | 18 | 2:0 | 141 | 18.158 |
| 19 | 2:25 | 140 | 44.8546 | 20 | 2:33 | 139 | 17.7257 | 21 | 2:50 | -139 | 26.2542 |
| 22 | 3:20 | 139 | 53.177 | 23 | 3:33 | 140 | 62.7964 | 24 | 4:20 | 139 | 44.3142 |
| 25 | 4:30 | 138 | 17.3855 | 26 | 4:50 | 137 | 34.5067 | 27 | 6:25 | 136 | 162.233 |
| 28 | 6:50 | 137 | 43.2333 | 29 | 7:15 | 136 | 42.6929 | 30 | 8:5 | 135 | 84.385 |
| 31 | 8:20 | 136 | 25.6158 | 32 | 8:33 | 135 | 25.2315 | 33 | 8:50 | 134 | 24.5672 |
| 34 | 9:5 | 133 | 24.643 | 35 | 9:15 | 132 | 16.2125 | 36 | 9:25 | 131 | 15.9963 |
| 37 | 9:30 | 130 | 7.89000 | 38 | 9:33 | 129 | 7.782 | 39 | 9:40 | 128 | 7.67392 |
| 40 | 9:50 | 127 | 15.1317 | 41 | 9:55 | 126 | 7.45773 | 42 | 10:10 | 125 | 22.049 |
| 43 | 10:20 | 124 | 14.4452 | 44 | 10:30 | 123 | 14.267 | 45 | 10:33 | 122 | 7.82542 |
| 46 | 10:40 | 121 | 6.91733 | 47 | 10:45 | 119 | 6.78117 | 48 | 10:50 | 118 | 13.1852 |
| 49 | 11:0 | 117 | 6.405 | 50 | 11:10 | 115 | 12.5377 | 51 | 11:15 | 114 | 6.16073 |
| 52 | 11:20 | 112 | 5.9450 | 53 | 11:30 | 111 | 11.673 | 54 | 11:33 | 109 | 5.62833 |
| 55 | 11:40 | 108 | 5.51225 | 56 | 11:30 | 107 | 18.803 | 57 | 11:55 | 105 | 5.100 |
| 58 | 12:0 | 104 | 5.67392 | 59 | 12:5 | 103 | 4.57183 | 60 | 12:15 | 102 | 9.7273 |
| 61 | 12:20 | 101 | 4.73357 | 62 | 12:25 | 98 | 4.43142 | 63 | 999:0 | 0 | 0 |

```
                GPM..: 1.297
TOTAL TIME IN SEC. S= 745
TOTAL OUTPUT IN DEGREE/GALLONS (100 DEG DATUM)= 1258.41
TOTAL OUTPUT IN DEGREE-GALLONS/KW= 347.917
TOTAL OUTPUT IN DEGREE-GALLONS/KW/SQ.FT= 26.3573

GPM...... 1.67

WATER HEIGHTS, In. ...10 & 0          TOTAL ELAPSED TIME
    WATER INLET TEMP. DEG F... 56            (MIN.S:SEC.S)... 9 : 10
    TOTAL GALLONS COLLECTED...15.3        INPUT AMPS/VOLTS... 15 / 245
    TOTAL EXT. SURFACE AREA (SQ.FT)= 13.2 TOTAL INPUT.KW.... 3.256
```

INPUT DATA

| TIME: | 0:5 | 0:10 | 0:15 | 0:20 | 0:25 | 0:30 | 0:35 | 0:40 | 0:45 | 0:50 | 0:55 | 0:60 |
|---|---|---|---|---|---|---|---|---|---|---|---|---|
| TEMP: | 167 | 167 | 167 | 166 | 166 | 165 | 163 | 159 | 155 | 150 | 147 | 145 |
| TIME: | 1:5 | 1:10 | 1:15 | 1:20 | 1:25 | 1:30 | 1:35 | 1:40 | 1:45 | 1:50 | 1:55 | 1:60 |
| TEMP: | 143 | 142 | 141 | 139 | 139 | 138 | 138 | 138 | 138 | 137 | 137 | 136 |
| TIME: | 2:5 | 2:10 | 2:15 | 2:20 | 2:25 | 2:30 | 2:35 | 2:40 | 2:45 | 2:50 | 2:55 | 2:60 |
| TEMP: | 135 | 134 | 134 | 134 | 133 | 133 | 133 | 133 | 133 | 133 | 133 | 134 |
| TIME: | 3:5 | 3:10 | 3:15 | 3:20 | 3:25 | 3:30 | 3:35 | 3:40 | 3:45 | 3:50 | 3:55 | 3:60 |
| TEMP: | 134 | 134 | 134 | 133 | 133 | 133 | 133 | 132 | 132 | 132 | 131 | 131 |
| TIME: | 4:5 | 4:10 | 4:15 | 4:20 | 4:25 | 4:30 | 4:35 | 4:40 | 4:45 | 4:50 | 4:55 | 4:60 |
| TEMP: | 131 | 132 | 132 | 132 | 132 | 132 | 131 | 131 | 131 | 131 | 131 | 130 |
| TIME: | 5:5 | 5:10 | 5:15 | 5:20 | 5:25 | 5:30 | 5:35 | 5:40 | 5:45 | 5:50 | 5:55 | 5:60 |
| TEMP: | 130 | 130 | 130 | 130 | 130 | 130 | 130 | 131 | 131 | 131 | 131 | 130 |
| TIME: | 6:5 | 6:10 | 6:15 | 6:20 | 6:25 | 6:30 | 6:35 | 6:40 | 6:45 | 6:50 | 6:55 | 6:60 |
| TEMP: | 129 | 129 | 129 | 128 | 127 | 127 | 128 | 128 | 128 | 128 | 128 | 128 |
| TIME: | 7:5 | 7:10 | 7:15 | 7:20 | 7:25 | 7:30 | 7:35 | 7:40 | 7:45 | 7:50 | 7:55 | 7:60 |
| TEMP: | 128 | 128 | 127 | 126 | 124 | 123 | 122 | 123 | 121 | 120 | 119 | 117 |
| TIME: | 8:5 | 8:10 | 8:15 | 8:20 | 8:25 | 8:30 | 8:35 | 8:40 | 8:45 | 8:50 | 8:55 | 8:60 |
| TEMP: | 116 | 115 | 114 | 112 | 110 | 109 | 109 | 105 | 105 | 104 | 102 | 102 |
| TIME: | 9:5 | 9:10 | 9:15 | 9:20 | 9:25 | 9:30 | 9:35 | 9:40 | 9:45 | 9:50 | 9:55 | 9:60 |
| TEMP: | 102 | 100 | 0 | 0 | 0 | 0 | 0 | 0 | 0 | 0 | 0 | 0 |

DEGREE-GALLONS OUTPUT DATA:

| I | TIME | T(I) | DG(I) | I | TIME | T(I) | DG(I) | I | TIME | T(I) | DG(I) |
|---|---|---|---|---|---|---|---|---|---|---|---|
| 1 | 0:15 | 167 | 46.3125 | 2 | 0:25 | 166 | 38.6167 | 3 | 0:30 | 165 | 15.1692 |
| 4 | 0:35 | 163 | 14.000 | 5 | 0:40 | 159 | 14.3342 | 6 | 0:45 | 155 | 13.7775 |
| 7 | 0:50 | 150 | 13.0017 | 8 | 0:55 | 147 | 12.6642 | 9 | 1:0 | 145 | 12.353 |
| 10 | 1:5 | 143 | 12.1875 | 11 | 1:10 | 142 | 11.9683 | 12 | 1:15 | 141 | 11.8232 |
| 13 | 1:25 | 139 | 23.1017 | 14 | 1:45 | 138 | 45.8467 | 15 | 1:55 | 137 | 22.343 |
| 16 | 2:0 | 136 | 11.1333 | 17 | 2:5 | 135 | 18.9342 | 18 | 2:20 | 134 | 32.353 |
| 19 | 2:55 | 133 | 75.0100 | 20 | 3:15 | 134 | 43.42 | 21 | 3:35 | 133 | 42.8633 |
| 22 | 3:50 | 132 | 31.75 | 23 | 4:5 | 131 | 31.3125 | 24 | 4:30 | 132 | 32.8833 |
| 25 | 4:55 | 131 | 32.1875 | 26 | 5:35 | 130 | 82.3067 | 27 | 5:55 | 131 | 41.75 |
| 28 | 6:0 | 130 | 18.2983 | 29 | 6:15 | 129 | 38.4775 | 30 | 6:20 | 128 | 18.82 |
| 31 | 6:30 | 127 | 13.7617 | 32 | 6:40 | 128 | 20.06 | 33 | 7:5 | 128 | 58.7958 |
| 34 | 7:10 | 128 | 18.82 | 35 | 7:15 | 127 | 9.0083 | 36 | 7:20 | 126 | 9.74167 |
| 37 | 7:25 | 124 | 9.4533 | 38 | 7:30 | 123 | 9.32417 | 39 | 7:35 | 122 | 9.185 |
| 40 | 7:40 | 123 | 9.32417 | 41 | 7:45 | 121 | 9.0453 | 42 | 7:50 | 120 | 8.90667 |
| 43 | 7:55 | 119 | 8.7675 | 44 | 8:0 | 117 | 8.48917 | 45 | 8:5 | 116 | 8.35 |
| 46 | 8:10 | 115 | 8.21083 | 47 | 8:15 | 114 | 8.07167 | 48 | 8:20 | 112 | 7.79333 |
| 49 | 8:25 | 110 | 7.515 | 50 | 8:35 | 109 | 14.7317 | 51 | 8:45 | 105 | 13.6383 |
| 52 | 8:50 | 104 | 6.60 | 53 | 9:0 | 102 | 12.8833 | 54 | 9:5 | 101 | 6.2623 |
| 55 | 9:10 | 100 | 6.12333 | 56 | 999:0 | 0 | 0 | 57 | 0:0 | 0 | 0 |

GPM... 1.67
TOTAL TIME IN SEC.S= 550
TOTAL OUTPUT IN DEGREE/GALLONS (100 DEG DATUM)= 1152.44
TOTAL OUTPUT IN DEGREE-GALLONS/KW= 353.943
TOTAL OUTPUT IN DEGREE-GALLONS/KW/SQ.FT= 26.8139

GPM...... 2.43

| | |
|---|---|
| WATER HEIGHTS, In. ...9 1/2 & 8 | TOTAL ELAPSED TIME (MIN.S:SEC.S)... 5:55 |
| WATER INLET TEMP. DEG F... 56 | INPUT AMPS/VOLTS... 15 / 245 |
| TOTAL GALLONS COLLECTED...14.4 | TOTAL INPUT KW.... 3.19 |
| TOTAL EXT. SURFACE AREA (SQ.FT)= 13.2 | |

INPUT DATA

| TIME: | 0:5 | 0:10 | 0:15 | 0:20 | 0:25 | 0:30 | 0:35 | 0:40 | 0:45 | 0:50 | 0:55 | 0:60 |
|---|---|---|---|---|---|---|---|---|---|---|---|---|
| TEMP: | 167 | 167 | 166 | 165 | 160 | 155 | 149 | 146 | 144 | 140 | 139 | 138 |

| TIME: | 1:5 | 1:10 | 1:15 | 1:20 | 1:25 | 1:30 | 1:35 | 1:40 | 1:45 | 1:50 | 1:55 | 1:60 |
|---|---|---|---|---|---|---|---|---|---|---|---|---|
| TEMP: | 137 | 137 | 136 | 135 | 135 | 135 | 134 | 134 | 134 | 133 | 133 | 133 |

| TIME: | 2:5 | 2:10 | 2:15 | 2:20 | 2:25 | 2:30 | 2:35 | 2:40 | 2:45 | 2:50 | 2:55 | 2:60 |
|---|---|---|---|---|---|---|---|---|---|---|---|---|
| TEMP: | 132 | 132 | 131 | 131 | 131 | 131 | 130 | 130 | 130 | 130 | 129 | 129 |

| TIME: | 3:5 | 3:10 | 3:15 | 3:20 | 3:25 | 3:30 | 3:35 | 3:40 | 3:45 | 3:50 | 3:55 | 3:60 |
|---|---|---|---|---|---|---|---|---|---|---|---|---|
| TEMP: | 129 | 129 | 129 | 129 | 129 | 129 | 129 | 128 | 127 | 126 | 126 | 126 |

| TIME: | 4:5 | 4:10 | 4:15 | 4:20 | 4:25 | 4:30 | 4:35 | 4:40 | 4:45 | 4:50 | 4:55 | 4:60 |
|---|---|---|---|---|---|---|---|---|---|---|---|---|
| TEMP: | 126 | 126 | 126 | 126 | 126 | 125 | 124 | 123 | 120 | 119 | 118 | 120 |

| TIME: | 5:5 | 5:10 | 5:15 | 5:20 | 5:25 | 5:30 | 5:35 | 5:40 | 5:45 | 5:50 | 5:55 | 5:60 |
|---|---|---|---|---|---|---|---|---|---|---|---|---|
| TEMP: | 121 | 121 | 121 | 118 | 114 | 112 | 108 | 107 | 104 | 102 | 100 | 0 |

DEGREE-GALLONS OUTPUT DATA:

| I | TIME | T(I) | DG(I) | I | TIME | T(I) | DG(I) | I | TIME | T(I) | DG(I) |
|---|---|---|---|---|---|---|---|---|---|---|---|
| 1 | 0:10 | 167 | 44.55 | 2 | 0:15 | 166 | 22.275 | 3 | 0:20 | 165 | 22.8725 |
| 4 | 0:25 | 160 | 21.05 | 5 | 0:30 | 155 | 28.0475 | 6 | 0:35 | 149 | 18.8325 |
| 7 | 0:40 | 146 | 18.225 | 8 | 0:45 | 144 | 17.82 | 9 | 0:50 | 140 | 17.81 |
| 10 | 0:55 | 139 | 16.8875 | 11 | 1:0 | 138 | 16.605 | 12 | 1:10 | 137 | 32.805 |
| 13 | 1:15 | 136 | 16.2 | 14 | 1:30 | 135 | 47.9525 | 15 | 1:45 | 134 | 47.385 |
| 16 | 2:0 | 133 | 46.7775 | 17 | 2:10 | 132 | 38.78 | 18 | 2:30 | 131 | 68.75 |
| 19 | 2:50 | 130 | 53.96 | 20 | 3:35 | 129 | 133.842 | 21 | 3:40 | 128 | 14.58 |
| 22 | 3:45 | 127 | 14.3775 | 23 | 3:55 | 126 | 28.35 | 24 | 4:0 | 125 | 13.9725 |
| 25 | 4:25 | 126 | 78.875 | 26 | 4:30 | 125 | 13.9725 | 27 | 4:35 | 124 | 13.77 |
| 28 | 4:40 | 123 | 13.3575 | 29 | 4:45 | 120 | 12.95 | 30 | 4:50 | 119 | 12.7575 |
| 31 | 4:55 | 118 | 12.555 | 32 | 5:0 | 120 | 12.95 | 33 | 5:15 | 121 | 39.4875 |
| 34 | 5:20 | 118 | 12.555 | 35 | 5:25 | 114 | 11.745 | 36 | 5:30 | 112 | 11.34 |
| 37 | 5:35 | 108 | 18.55 | 38 | 5:40 | 107 | 18.3275 | 39 | 5:45 | 104 | 9.72 |
| 40 | 5:50 | 102 | 9.315 | 41 | 5:55 | 100 | 8.91 | 42 | 999:0 | 0 | 0 |

GPM... 2.43
TOTAL TIME IN SEC.S= 355
TOTAL OUTPUT IN DEGREE/GALLONS (100 DEG DATUM)= 1070.01
TOTAL OUTPUT IN DEGREE-GALLONS/KW= 335.426
TOTAL OUTPUT IN DEGREE-GALLONS/KW/SQ.FT= 25.4111

GPM...... 2.77

WATER HEIGHTS. In. ...8 1/2 & 1 1/2
WATER INLET TEMP. DEG F... 57
TOTAL GALLONS COLLECTED...14.55
TOTAL EXT. SURFACE AREA (SQ.FT)= 13.2

TIME..
TOTAL ELAPSED TIME
 (MIN.S:SEC.S)... 5 : 15
INPUT AMPS/VOLTS... 15 / 245
TOTAL INPUT KW.... 3.159

INPUT DATA

| TIME: | 0:5 | 0:10 | 0:15 | 0:20 | 0:25 | 0:30 | 0:35 | 0:40 | 0:45 | 0:50 | 0:55 | 0:60 |
|---|---|---|---|---|---|---|---|---|---|---|---|---|
| TEMP: | 167 | 166 | 164 | 163 | 152 | 152 | 146 | 143 | 142 | 140 | 137 | 137 |

| TIME: | 1:5 | 1:10 | 1:15 | 1:20 | 1:25 | 1:30 | 1:35 | 1:40 | 1:45 | 1:50 | 1:55 | 1:60 |
|---|---|---|---|---|---|---|---|---|---|---|---|---|
| TEMP: | 137 | 136 | 135 | 135 | 134 | 132 | 132 | 132 | 132 | 132 | 131 | 131 |

| TIME: | 2:5 | 2:10 | 2:15 | 2:20 | 2:25 | 2:30 | 2:35 | 2:40 | 2:45 | 2:50 | 2:55 | 2:60 |
|---|---|---|---|---|---|---|---|---|---|---|---|---|
| TEMP: | 131 | 131 | 131 | 131 | 130 | 130 | 130 | 129 | 129 | 129 | 129 | 129 |

| TIME: | 3:5 | 3:10 | 3:15 | 3:20 | 3:25 | 3:30 | 3:35 | 3:40 | 3:45 | 3:50 | 3:55 | 3:60 |
|---|---|---|---|---|---|---|---|---|---|---|---|---|
| TEMP: | 128 | 128 | 127 | 127 | 126 | 125 | 125 | 125 | 125 | 124 | 124 | 124 |

| TIME: | 4:5 | 4:10 | 4:15 | 4:20 | 4:25 | 4:30 | 4:35 | 4:40 | 4:45 | 4:50 | 4:55 | 4:60 |
|---|---|---|---|---|---|---|---|---|---|---|---|---|

|  | 23 | | | | | | | | | 24 | | |
|---|---|---|---|---|---|---|---|---|---|---|---|---|
| TEMP: | 123 | 121 | 120 | 118 | 118 | 118 | 119 | 117 | 116 | 111 | 110 | 105 |

| TIME: | 5:5 | 5:10 | 5:15 | 5:20 | 5:25 | 5:30 | 5:35 | 5:40 | 5:45 | 5:50 | 5:55 | 5:60 |
|---|---|---|---|---|---|---|---|---|---|---|---|---|
| TEMP: | 101 | 101 | 100 | 0 | 0 | 0 | 0 | 0 | 0 | 0 | 0 | 0 |

DEGREE-GALLONS OUTPUT DATA:

| I | TIME | T(I) | DG(I) | I | TIME | T(I) | DG(I) | I | TIME | T(I) | DG(I) |
|---|---|---|---|---|---|---|---|---|---|---|---|
| 1 | 0:5 | 167 | 25.3917 | 2 | 0:10 | 166 | 25.1600 | 3 | 0:15 | 164 | 24.6992 |
| 4 | 0:20 | 153 | 24.4683 | 5 | 0:30 | 152 | 43.8503 | 6 | 0:35 | 146 | 28.5442 |
| 7 | 0:40 | 143 | 19.6517 | 8 | 0:45 | 142 | 19.6200 | 9 | 0:50 | 140 | 19.1592 |
| 10 | 1:0 | 137 | 55.4 | 11 | 1:10 | 135 | 18.2350 | 12 | 1:20 | 135 | 36.81 |
| 13 | 1:25 | 134 | 17.7742 | 14 | 1:45 | 132 | 63.25 | 15 | 2:20 | 131 | 119.572 |
| 16 | 2:30 | 130 | 58.5523 | 17 | 2:40 | 129 | 16.62 | 18 | 2:50 | 128 | 32.7783 |
| 19 | 3:0 | 128 | 33.24 | 20 | 3:10 | 128 | 32.7783 | 21 | 3:20 | 127 | 32.3167 |
| 22 | 3:25 | 126 | 19.9273 | 23 | 3:45 | 125 | 62.7067 | 24 | 4:0 | 124 | 46.3973 |
| 25 | 4:5 | 123 | 15.25 | 26 | 4:10 | 121 | 14.7733 | 27 | 4:15 | 120 | 14.5423 |
| 28 | 4:25 | 118 | 27.2303 | 29 | 4:30 | 118 | 14.0000 | 30 | 4:35 | 119 | 14.3117 |
| 31 | 4:40 | 117 | 13.85 | 32 | 4:45 | 116 | 13.6192 | 33 | 4:50 | 111 | 12.465 |
| 34 | 4:55 | 110 | 12.2342 | 35 | 5:0 | 105 | 11.00 | 36 | 5:10 | 101 | 20.3133 |
| 37 | 5:15 | 100 | 9.9293 | 38 | 999:0 | 0 | 0 | 39 | 0:0 | 0 | 0 |

GPM... 2.77
TOTAL TIME IN SEC.S= 315
TOTAL OUTPUT IN DEGREE/GALLONS (100 DEG DATUM)= 1056.06
TOTAL OUTPUT IN DEGREE-GALLONS/KW= 334.303
TOTAL OUTPUT IN DEGREE-GALLONS/KW/SQ.FT= 25.326

GPM...... 3.564

NO. OF TURNS OPEN...3/4
WATER HEIGHTS, In. ...9 3/4 & 0
WATER INLET TEMP. DEG F... 56
TOTAL GALLONS COLLECTED... 14.85
TOTAL EXT. SURFACE AREA (SQ.FT)= 13.2

DATE...NOV 25 83     TIME..
TOTAL ELAPSED TIME
  (MIN.S:SEC.S)... 4 : 10
INPUT AMPS/VOLTS... 15 / 242
TOTAL INPUT KW.... 3.055

INPUT DATA

| TIME: | 0:5 | 0:10 | 0:15 | 0:20 | 0:25 | 0:30 | 0:35 | 0:40 | 0:45 | 0:50 | 0:55 | 0:60 |
|---|---|---|---|---|---|---|---|---|---|---|---|---|
| TEMP: | 168 | 165 | 162 | 158 | 149 | 144 | 143 | 139 | 138 | 137 | 135 | 135 |

| TIME: | 1:5 | 1:10 | 1:15 | 1:20 | 1:25 | 1:30 | 1:35 | 1:40 | 1:45 | 1:50 | 1:55 | 1:60 |
|---|---|---|---|---|---|---|---|---|---|---|---|---|
| TEMP: | 135 | 134 | 133 | 133 | 132 | 131 | 131 | 131 | 130 | 130 | 130 | 129 |

| TIME: | 2:5 | 2:10 | 2:15 | 2:20 | 2:25 | 2:30 | 2:35 | 2:40 | 2:45 | 2:50 | 2:55 | 2:60 |
|---|---|---|---|---|---|---|---|---|---|---|---|---|
| TEMP: | 129 | 129 | 128 | 128 | 125 | 126 | 127 | 126 | 125 | 124 | 123 | 122 |

| TIME: | 3:5 | 3:10 | 3:15 | 3:20 | 3:25 | 3:30 | 3:35 | 3:40 | 3:45 | 3:50 | 3:55 | 3:60 |
|---|---|---|---|---|---|---|---|---|---|---|---|---|
| TEMP: | 122 | 122 | 121 | 118 | 114 | 115 | 113 | 115 | 115 | 111 | 109 | 104 |

| TIME: | 4:5 | 4:10 | 4:15 | 4:20 | 4:25 | 4:30 | 4:35 | 4:40 | 4:45 | 4:50 | 4:55 | 4:60 |
|---|---|---|---|---|---|---|---|---|---|---|---|---|
| TEMP: | 101 | 97 | 0 | 0 | 0 | 0 | 0 | 0 | 0 | 0 | 0 | 0 |

DEGREE-GALLONS OUTPUT DATA:

| I | TIME | T(I) | DG(I) | I | TIME | T(I) | DG(I) | I | TIME | T(I) | DG(I) |
|---|---|---|---|---|---|---|---|---|---|---|---|
| 1 | 0:5 | 168 | 33.264 | 2 | 0:10 | 165 | 32.373 | 3 | 0:15 | 162 | 31.482 |
| 4 | 0:20 | 158 | 30.294 | 5 | 0:25 | 149 | 27.621 | 6 | 0:30 | 144 | 26.136 |
| 7 | 0:35 | 143 | 25.839 | 8 | 0:40 | 139 | 24.651 | 9 | 0:45 | 138 | 24.354 |
| 10 | 0:50 | 137 | 24.857 | 11 | 0:55 | 135 | 23.76 | 12 | 1:5 | 135 | 46.926 |
| 13 | 1:10 | 134 | 23.166 | 14 | 1:20 | 133 | 45.738 | 15 | 1:25 | 132 | 22.572 |
| 16 | 1:40 | 131 | 66.825 | 17 | 1:55 | 130 | 65.934 | 18 | 2:10 | 129 | 65.243 |
| 19 | 2:20 | 128 | 42.768 | 20 | 2:30 | 126 | 41.38 | 21 | 2:35 | 127 | 21.887 |
| 22 | 2:40 | 126 | 20.79 | 23 | 2:45 | 125 | 20.493 | 24 | 2:50 | 124 | 20.195 |
| 25 | 2:55 | 123 | 19.899 | 26 | 3:10 | 122 | 58.896 | 27 | 3:15 | 121 | 19.305 |

| | | | | | | | | | | | |
|---|---|---|---|---|---|---|---|---|---|---|---|
| 28 | 3:30 | 118 | 18.414 | 29 | 3:35 | 114 | 17.226 | 30 | 3:30 | 115 | 17.523 |
| 31 | 3:35 | 113 | 16.929 | 32 | 3:45 | 115 | 33.846 | 33 | 3:50 | 111 | 16.335 |
| 34 | 3:55 | 108 | 15.444 | 35 | 4:0 | 104 | 14.256 | 36 | 4:5 | 101 | 13.365 |
| 37 | 4:10 | 97 | 12.177 | 38 | 999:0 | 0 | 0 | 39 | 0:0 | 0 | 0 |

```
MODEL....CMPRT1     GPM... 3.564
TOTAL TIME IN SEC.S= 250
TOTAL OUTPUT IN DEGREE/GALLONS (100 DEG DATUM)= 1081.67
TOTAL OUTPUT IN DEGREE-GALLONS/KW= 354.067
TOTAL OUTPUT IN DEGREE-GALLONS/KW/SQ.FT= 26.8232
```

GPM...... 4.21

```
                                                        TIME..
WATER HEIGHTS, In. ...9 1/2 & 0        TOTAL ELAPSED TIME
WATER INLET TEMP. DEG F... 56            (MIN.S:SEC.S)... 3 : 25
TOTAL GALLONS COLLECTED...14.4         INPUT AMPS/VOLTS... 15.2 / 246
TOTAL EXT. SURFACE AREA (SQ.FT)= 13.2  TOTAL INPUT-KW.... 3.027
```

INPUT DATA

| TIME: | 0:5 | 0:10 | 0:15 | 0:20 | 0:25 | 0:30 | 0:35 | 0:40 | 0:45 | 0:50 | 0:55 | 0:60 |
|---|---|---|---|---|---|---|---|---|---|---|---|---|
| TEMP: | 164 | 160 | 153 | 147 | 143 | 139 | 137 | 136 | 134 | 133 | 132 | 132 |

| TIME: | 1:5 | 1:10 | 1:15 | 1:20 | 1:25 | 1:30 | 1:35 | 1:40 | 1:45 | 1:50 | 1:55 | 1:60 |
|---|---|---|---|---|---|---|---|---|---|---|---|---|
| TEMP: | 131 | 130 | 130 | 129 | 129 | 128 | 128 | 127 | 126 | 126 | 125 | 124 |

| TIME: | 2:5 | 2:10 | 2:15 | 2:20 | 2:25 | 2:30 | 2:35 | 2:40 | 2:45 | 2:50 | 2:55 | 2:60 |
|---|---|---|---|---|---|---|---|---|---|---|---|---|
| TEMP: | 123 | 122 | 122 | 120 | 119 | 117 | 116 | 115 | 114 | 111 | 109 | 108 |

| TIME: | 3:5 | 3:10 | 3:15 | 3:20 | 3:25 | 3:30 | 3:35 | 3:40 | 3:45 | 3:50 | 3:55 | 3:60 |
|---|---|---|---|---|---|---|---|---|---|---|---|---|
| TEMP: | 106 | 103 | 102 | 101 | 100 | 0 | 0 | 0 | 0 | 0 | 0 | 0 |

DEGREE-GALLONS OUTPUT DATA:

| I | TIME | T(I) | DG(I) | I | TIME | T(I) | DG(I) | I | TIME | T(I) | DG(I) |
|---|---|---|---|---|---|---|---|---|---|---|---|
| 1 | 0:5 | 164 | 37.89 | 2 | 0:10 | 160 | 36.4867 | 3 | 0:15 | 153 | 34.8388 |
| 4 | 0:20 | 147 | 31.9258 | 5 | 0:25 | 143 | 30.5225 | 6 | 0:30 | 139 | 29.7683 |
| 7 | 0:35 | 137 | 28.4175 | 8 | 0:40 | 136 | 28.8667 | 9 | 0:45 | 134 | 27.365 |
| 10 | 0:50 | 133 | 27.0142 | 11 | 1:0 | 132 | 53.3267 | 12 | 1:5 | 131 | 26.3125 |
| 13 | 1:15 | 130 | 51.9233 | 14 | 1:25 | 129 | 51.2217 | 15 | 1:35 | 128 | 50.52 |
| 16 | 1:40 | 127 | 24.9892 | 17 | 1:45 | 125 | 24.2875 | 18 | 1:50 | 124 | 23.8567 |
| 19 | 1:55 | 125 | 24.2875 | 20 | 2:0 | 124 | 23.8567 | 21 | 2:0 | 123 | 23.5858 |
| 22 | 2:15 | 122 | 46.31 | 23 | 2:20 | 120 | 22.4533 | 24 | 2:25 | 119 | 22.1025 |
| 25 | 2:30 | 117 | 21.6000 | 26 | 2:35 | 116 | 21.85 | 27 | 2:40 | 115 | 20.6992 |
| 28 | 2:45 | 114 | 20.3483 | 29 | 2:50 | 111 | 19.2958 | 30 | 2:55 | 109 | 18.5942 |
| 31 | 3:0 | 108 | 18.2433 | 32 | 3:5 | 106 | 17.5417 | 33 | 3:10 | 103 | 16.4892 |
| 34 | 3:15 | 102 | 16.1383 | 35 | 3:20 | 101 | 15.7875 | 36 | 3:25 | 100 | 15.4367 |

```
                GPM... 4.21
TOTAL TIME IN SEC.S= 205
TOTAL OUTPUT IN DEGREE/GALLONS (100 DEG DATUM)= 1000.23
TOTAL OUTPUT IN DEGREE-GALLONS/KW= 330.435
TOTAL OUTPUT IN DEGREE-GALLONS/KW/SQ.FT= 25.0329
```

MODEL...SEARS 300

GPM...... 1.853

```
                                                        TIME..
WATER HEIGHTS, In. ...12 1/2 & 4       TOTAL ELAPSED TIME
WATER INLET TEMP. DEG F... 57            (MIN.S:SEC.S)... 24 : 10
TOTAL GALLONS COLLECTED... 25.46       INPUT AMPS/VOLTS... 15.7 / 250
TOTAL EXT. SURFACE AREA (SQ.FT)= 15.89  TOTAL INPUT KW.... 6.666
```

INPUT DATA

| TIME: | 0:5 | 0:10 | 0:15 | 0:20 | 0:25 | 0:30 | 0:35 | 0:40 | 0:45 | 0:50 | 0:55 | 0:60 |
|---|---|---|---|---|---|---|---|---|---|---|---|---|
| TEMP: | 141 | 141 | 141 | 141 | 141 | 141 | 141 | 141 | 141 | 141 | 141 | 141 |
| TIME: | 1:5 | 1:10 | 1:15 | 1:20 | 1:25 | 1:30 | 1:35 | 1:40 | 1:45 | 1:50 | 1:55 | 1:60 |
| TEMP: | 141 | 141 | 141 | 141 | 141 | 141 | 141 | 141 | 141 | 141 | 141 | 141 |
| TIME: | 2:5 | 2:10 | 2:15 | 2:20 | 2:25 | 2:30 | 2:35 | 2:40 | 2:45 | 2:50 | 2:55 | 2:60 |
| TEMP: | 141 | 141 | 141 | 141 | 141 | 141 | 141 | 141 | 141 | 141 | 141 | 141 |
| TIME: | 3:5 | 3:10 | 3:15 | 3:20 | 3:25 | 3:30 | 3:35 | 3:40 | 3:45 | 3:50 | 3:55 | 3:60 |
| TEMP: | 141 | 141 | 141 | 141 | 141 | 141 | 141 | 141 | 141 | 141 | 141 | 141 |
| TIME: | 4:5 | 4:10 | 4:15 | 4:20 | 4:25 | 4:30 | 4:35 | 4:40 | 4:45 | 4:50 | 4:55 | 4:60 |
| TEMP: | 141 | 141 | 141 | 141 | 141 | 141 | 141 | 141 | 141 | 141 | 141 | 141 |
| TIME: | 5:5 | 5:10 | 5:15 | 5:20 | 5:25 | 5:30 | 5:35 | 5:40 | 5:45 | 5:50 | 5:55 | 5:60 |
| TEMP: | 141 | 141 | 141 | 141 | 141 | 141 | 141 | 141 | 141 | 141 | 141 | 141 |
| TIME: | 6:5 | 6:10 | 6:15 | 6:20 | 6:25 | 6:30 | 6:35 | 6:40 | 6:45 | 6:50 | 6:55 | 6:60 |
| TEMP: | 140 | 140 | 140 | 140 | 140 | 140 | 140 | 140 | 140 | 140 | 140 | 140 |
| TIME: | 7:5 | 7:10 | 7:15 | 7:20 | 7:25 | 7:30 | 7:35 | 7:40 | 7:45 | 7:50 | 7:55 | 7:60 |
| TEMP: | 140 | 140 | 140 | 140 | 140 | 140 | 140 | 140 | 140 | 140 | 140 | 140 |
| TIME: | 8:5 | 8:10 | 8:15 | 8:20 | 8:25 | 8:30 | 8:35 | 8:40 | 8:45 | 8:50 | 8:55 | 8:60 |
| TEMP: | 140 | 140 | 140 | 140 | 140 | 140 | 140 | 140 | 140 | 140 | 140 | 140 |
| TIME: | 9:5 | 9:10 | 9:15 | 9:20 | 9:25 | 9:30 | 9:35 | 9:40 | 9:45 | 9:50 | 9:55 | 9:60 |
| TEMP: | 140 | 140 | 140 | 140 | 140 | 139 | 139 | 139 | 139 | 139 | 139 | 139 |
| TIME: | 10:5 | 10:10 | 10:15 | 10:20 | 10:25 | 10:30 | 10:35 | 10:40 | 10:45 | 10:50 | 10:55 | 10:60 |
| TEMP: | 139 | 139 | 139 | 139 | 139 | 139 | 139 | 139 | 139 | 139 | 139 | 139 |
| TIME: | 11:5 | 11:10 | 11:15 | 11:20 | 11:25 | 11:30 | 11:35 | 11:40 | 11:45 | 11:50 | 11:55 | 11:60 |
| TEMP: | 139 | 139 | 139 | 139 | 139 | 139 | 139 | 139 | 139 | 139 | 138 | 138 |
| TIME: | 12:5 | 12:10 | 12:15 | 12:20 | 12:25 | 12:30 | 12:35 | 12:40 | 12:45 | 12:50 | 12:55 | 12:60 |
| TEMP: | 138 | 138 | 138 | 138 | 138 | 138 | 138 | 138 | 138 | 138 | 138 | 138 |
| TIME: | 13:5 | 13:10 | 13:15 | 13:20 | 13:25 | 13:30 | 13:35 | 13:40 | 13:45 | 13:50 | 13:55 | 13:60 |
| TEMP: | 138 | 138 | 138 | 138 | 137 | 137 | 137 | 137 | 137 | 137 | 137 | 137 |
| TIME: | 14:5 | 14:10 | 14:15 | 14:20 | 14:25 | 14:30 | 14:35 | 14:40 | 14:45 | 14:50 | 14:55 | 14:60 |
| TEMP: | 137 | 137 | 137 | 137 | 137 | 137 | 137 | 137 | 136 | 136 | 136 | 136 |
| TIME: | 15:5 | 15:10 | 15:15 | 15:20 | 15:25 | 15:30 | 15:35 | 15:40 | 15:45 | 15:50 | 15:55 | 15:60 |
| TEMP: | 136 | 136 | 136 | 136 | 136 | 136 | 136 | 136 | 136 | 136 | 136 | 136 |
| TIME: | 16:5 | 16:10 | 16:15 | 16:20 | 16:25 | 16:30 | 16:35 | 16:40 | 16:45 | 16:50 | 16:55 | 16:60 |
| TEMP: | 135 | 135 | 135 | 135 | 135 | 135 | 135 | 135 | 135 | 135 | 135 | 134 |
| TIME: | 17:5 | 17:10 | 17:15 | 17:20 | 17:25 | 17:30 | 17:35 | 17:40 | 17:45 | 17:50 | 17:55 | 17:60 |
| TEMP: | 134 | 134 | 134 | 134 | 134 | 134 | 134 | 134 | 133 | 133 | 133 | 133 |
| TIME: | 18:5 | 18:10 | 18:15 | 18:20 | 18:25 | 18:30 | 18:35 | 18:40 | 18:45 | 18:50 | 18:55 | 18:60 |
| TEMP: | 133 | 133 | 133 | 133 | 133 | 132 | 132 | 132 | 132 | 132 | 132 | 132 |
| TIME: | 19:5 | 19:10 | 19:15 | 19:20 | 19:25 | 19:30 | 19:35 | 19:40 | 19:45 | 19:50 | 19:55 | 19:60 |
| TEMP: | 132 | 131 | 131 | 131 | 131 | 131 | 131 | 130 | 130 | 130 | 130 | 130 |
| TIME: | 20:5 | 20:10 | 20:15 | 20:20 | 20:25 | 20:30 | 20:35 | 20:40 | 20:45 | 20:50 | 20:55 | 20:60 |
| TEMP: | 130 | 129 | 129 | 129 | 129 | 128 | 128 | 128 | 128 | 128 | 127 | 127 |
| TIME: | 21:5 | 21:10 | 21:15 | 21:20 | 21:25 | 21:30 | 21:35 | 21:40 | 21:45 | 21:50 | 21:55 | 21:60 |
| TEMP: | 127 | 126 | 126 | 126 | 126 | 125 | 125 | 124 | 124 | 124 | 123 | 123 |
| TIME: | 22:5 | 22:10 | 22:15 | 22:20 | 22:25 | 22:30 | 22:35 | 22:40 | 22:45 | 22:50 | 22:55 | 22:60 |
| TEMP: | 123 | 122 | 122 | 121 | 121 | 120 | 120 | 119 | 119 | 118 | 118 | 117 |
| TIME: | 23:5 | 23:10 | 23:15 | 23:20 | 23:25 | 23:30 | 23:35 | 23:40 | 23:45 | 23:50 | 23:55 | 23:60 |

| TIME: | 24:5 | 24:10 | 24:15 | 24:20 | 24:25 | 24:30 | 24:35 | 24:40 | 24:45 | 24:50 | 24:55 | 24:60 |
|---|---|---|---|---|---|---|---|---|---|---|---|
| TEMP: | 115 | 115 | 115 | 114 | 113 | 112 | 110 | 108 | 107 | 106 | 105 | 103 |
| TIME: | 24:5 | 24:10 | 24:15 | 24:20 | 24:25 | 24:30 | 24:35 | 24:40 | 24:45 | 24:50 | 24:55 | 24:60 |
| TEMP: | 102 | 100 | 0 | 0 | 0 | 0 | 0 | 0 | 0 | 0 | 0 | 0 |

DEGREE-GALLONS OUTPUT DATA:

| I | TIME | T(I) | DG(I) | I | TIME | T(I) | DG(I) | I | TIME | T(I) | DG(I) |
|---|---|---|---|---|---|---|---|---|---|---|---|
| 1 | 6:0 | 141 | 538.712 | 2 | 9:25 | 140 | 298.613 | 3 | 11:50 | 139 | 208.67 |
| 4 | 13:20 | 138 | 127.94 | 5 | 14:45 | 137 | 112.32 | 6 | 16:0 | 136 | 118.916 |
| 7 | 16:55 | 133 | 75.295 | 8 | 17:45 | 134 | 68.010 | 9 | 18:25 | 133 | 68.021 |
| 10 | 19:5 | 132 | 52.63 | 11 | 19:35 | 131 | 38.961 | 12 | 20:5 | 130 | 38.4345 |
| 13 | 20:25 | 129 | 25.272 | 14 | 20:50 | 128 | 31.1513 | 15 | 21:5 | 127 | 18.4275 |
| 16 | 21:25 | 126 | 24.219 | 17 | 21:35 | 125 | 11.534 | 18 | 21:50 | 124 | 17.6378 |
| 19 | 22:5 | 123 | 17.3745 | 20 | 22:15 | 122 | 11.4073 | 21 | 22:25 | 121 | 11.232 |
| 22 | 22:35 | 120 | 11.853 | 23 | 22:45 | 119 | 10.801 | 24 | 22:55 | 118 | 10.7053 |
| 25 | 23:0 | 117 | 5.253 | 26 | 23:5 | 116 | 5.1772 | 27 | 23:15 | 115 | 10.179 |
| 28 | 23:20 | 114 | 5.0173 | 29 | 23:25 | 113 | 4.914 | 30 | 23:30 | 112 | 4.8263 |
| 31 | 23:35 | 110 | 4.6373 | 32 | 23:40 | 108 | 4.4732 | 33 | 23:45 | 107 | 4.3873 |
| 34 | 23:50 | 106 | 4.2973 | 35 | 23:55 | 105 | 4.212 | 36 | 24:0 | 103 | 4.033 |
| 37 | 24:5 | 102 | 3.9467 | 38 | 24:10 | 100 | 3.7732 | 39 | 999:0 | 0 | 0 |

```
MODEL....SEARS 30G   GPM... 1.053
TOTAL TIME IN SEC.S= 1450
TOTAL OUTPUT IN DEGREE/GALLONS (100 DEG DATUM)= 1985.78
TOTAL OUTPUT IN DEGREE-GALLONS/KW= 289.136
TOTAL OUTPUT IN DEGREE-GALLONS/KW/SQ.FT= 18.1961
```

JDEL...SEARS 30G

GPM...... 1.04

|  |  |
|---|---|
| WATER HEIGHTS. In. ...10 & 7 1/2 | TOTAL ELAPSED TIME |
| WATER INLET TEMP. DEG F... 54 | (MIN.S:SEC.S)... 14 : 15 |
| TOTAL GALLONS COLLECTED... 26.23 | INPUT AMPS/VOLTS... 15.6 / 249 |
| TOTAL EXT. SURFACE AREA (SQ.FT)= 15.89 | TOTAL INPUT KW.... 6.306 |

INPUT DATA

| TIME: | 0:5 | 0:10 | 0:15 | 0:20 | 0:25 | 0:30 | 0:35 | 0:40 | 0:45 | 0:50 | 0:55 | 0:60 |
|---|---|---|---|---|---|---|---|---|---|---|---|
| TEMP: | 141 | 141 | 141 | 141 | 141 | 141 | 141 | 141 | 141 | 141 | 141 | 141 |
| TIME: | 1:5 | 1:10 | 1:15 | 1:20 | 1:25 | 1:30 | 1:35 | 1:40 | 1:45 | 1:50 | 1:55 | 1:60 |
| TEMP: | 141 | 141 | 141 | 141 | 141 | 141 | 141 | 141 | 141 | 141 | 141 | 141 |
| TIME: | 2:5 | 2:10 | 2:15 | 2:20 | 2:25 | 2:30 | 2:35 | 2:40 | 2:45 | 2:50 | 2:55 | 2:60 |
| TEMP: | 141 | 141 | 141 | 141 | 141 | 141 | 140 | 140 | 140 | 140 | 140 | 140 |
| TIME: | 3:5 | 3:10 | 3:15 | 3:20 | 3:25 | 3:30 | 3:35 | 3:40 | 3:45 | 3:50 | 3:55 | 3:60 |
| TEMP: | 140 | 140 | 140 | 140 | 140 | 139 | 139 | 139 | 139 | 139 | 139 | 139 |
| TIME: | 4:5 | 4:10 | 4:15 | 4:20 | 4:25 | 4:30 | 4:35 | 4:40 | 4:45 | 4:50 | 4:55 | 4:60 |
| TEMP: | 139 | 139 | 139 | 139 | 139 | 138 | 138 | 138 | 138 | 138 | 138 | 138 |
| TIME: | 5:5 | 5:10 | 5:15 | 5:20 | 5:25 | 5:30 | 5:35 | 5:40 | 5:45 | 5:50 | 5:55 | 5:60 |
| TEMP: | 138 | 138 | 138 | 137 | 137 | 137 | 137 | 137 | 137 | 137 | 137 | 136 |
| TIME: | 6:5 | 6:10 | 6:15 | 6:20 | 6:25 | 6:30 | 6:35 | 6:40 | 6:45 | 6:50 | 6:55 | 6:60 |
| TEMP: | 136 | 136 | 136 | 136 | 136 | 136 | 135 | 135 | 135 | 135 | 135 | 135 |
| TIME: | 7:5 | 7:10 | 7:15 | 7:20 | 7:25 | 7:30 | 7:35 | 7:40 | 7:45 | 7:50 | 7:55 | 7:60 |
| TEMP: | 135 | 135 | 134 | 134 | 134 | 134 | 134 | 134 | 134 | 134 | 133 | 133 |
| TIME: | 8:5 | 8:10 | 8:15 | 8:20 | 8:25 | 8:30 | 8:35 | 8:40 | 8:45 | 8:50 | 8:55 | 8:60 |
| TEMP: | 133 | 133 | 133 | 133 | 133 | 133 | 132 | 132 | 132 | 132 | 132 | 131 |

| TIME: | 9:5 | 9:10 | 9:15 | 9:20 | 9:25 | 9:30 | 9:35 | 9:40 | 9:45 | 9:50 | 9:55 | 9:60 |
|---|---|---|---|---|---|---|---|---|---|---|---|---|
| TEMP: | 131 | 131 | 131 | 131 | 130 | 130 | 130 | 130 | 130 | 129 | 129 | 129 |

| TIME: | 10:5 | 10:10 | 10:15 | 10:20 | 10:25 | 10:30 | 10:35 | 10:40 | 10:45 | 10:50 | 10:55 | 10:60 |
|---|---|---|---|---|---|---|---|---|---|---|---|---|
| TEMP: | 129 | 129 | 129 | 128 | 128 | 128 | 128 | 127 | 127 | 127 | 127 | 126 |

| TIME: | 11:5 | 11:10 | 11:15 | 11:20 | 11:25 | 11:30 | 11:35 | 11:40 | 11:45 | 11:50 | 11:55 | 11:60 |
|---|---|---|---|---|---|---|---|---|---|---|---|---|
| TEMP: | 126 | 126 | 126 | 126 | 125 | 125 | 124 | 124 | 124 | 123 | 123 | 123 |

| TIME: | 12:5 | 12:10 | 12:15 | 12:20 | 12:25 | 12:30 | 12:35 | 12:40 | 12:45 | 12:50 | 12:55 | 12:60 |
|---|---|---|---|---|---|---|---|---|---|---|---|---|
| TEMP: | 122 | 122 | 122 | 121 | 121 | 120 | 120 | 119 | 119 | 118 | 118 | 117 |

| TIME: | 13:5 | 13:10 | 13:15 | 13:20 | 13:25 | 13:30 | 13:35 | 13:40 | 13:45 | 13:50 | 13:55 | 13:60 |
|---|---|---|---|---|---|---|---|---|---|---|---|---|
| TEMP: | 116 | 116 | 115 | 114 | 114 | 113 | 113 | 111 | 110 | 109 | 107 | 106 |

| TIME: | 14:5 | 14:10 | 14:15 | 14:20 | 14:25 | 14:30 | 14:35 | 14:40 | 14:45 | 14:50 | 14:55 | 14:60 |
|---|---|---|---|---|---|---|---|---|---|---|---|---|
| TEMP: | 103 | 102 | 100 | 0 | 0 | 0 | 0 | 0 | 0 | 0 | 0 | 0 |

DEGREE-GALLONS OUTPUT DATA:

| I | TIME | T(I) | DG(I) | I | TIME | T(I) | DG(I) | I | TIME | T(I) | DG(I) |
|---|---|---|---|---|---|---|---|---|---|---|---|
| 1 | 2:30 | 141 | 488.2 | 2 | 3:25 | 140 | 145.853 | 3 | 4:25 | 139 | 156.4 |
| 4 | 5:15 | 138 | 128.8 | 5 | 5:55 | 137 | 101.813 | 6 | 6:30 | 136 | 88.8133 |
| 7 | 7:10 | 135 | 99.35 | 8 | 7:50 | 134 | 98.1333 | 9 | 8:30 | 133 | 95.9067 |
| 10 | 9:55 | 132 | 53.0 | 11 | 9:20 | 131 | 39.8333 | 12 | 9:45 | 130 | 38.2667 |
| 13 | 10:15 | 129 | 69 | 14 | 10:35 | 128 | 45.3067 | 15 | 10:55 | 127 | 44.7733 |
| 16 | 11:20 | 126 | 53.2 | 17 | 11:30 | 125 | 21.7733 | 18 | 11:45 | 124 | 32.2 |
| 19 | 12:0 | 123 | 31.74 | 20 | 12:15 | 122 | 31.20 | 21 | 12:25 | 121 | 28.5467 |
| 22 | 12:35 | 120 | 20.24 | 23 | 12:45 | 119 | 19.5333 | 24 | 12:55 | 118 | 19.6267 |
| 25 | 13:0 | 117 | 9.66 | 26 | 13:10 | 116 | 19.8133 | 27 | 13:15 | 115 | 9.3333 |
| 28 | 13:25 | 114 | 18.4 | 29 | 13:35 | 113 | 18.8533 | 30 | 13:40 | 111 | 8.74 |
| 31 | 13:45 | 110 | 8.5867 | 32 | 13:50 | 109 | 8.20 | 33 | 13:55 | 107 | 8.1267 |
| 34 | 14:0 | 106 | 7.9733 | 35 | 14:5 | 103 | 7.5133 | 36 | 14:10 | 102 | 7.35 |
| 37 | 14:15 | 100 | 7.8533 | 38 | 999:0 | 0 | 0 | 39 | 0:0 | 0 | 0 |

MODEL....SEARS 30G    GPM... 1.84
TOTAL TIME IN SEC. S= 855
TOTAL OUTPUT IN DEGREE/GALLONS (100 DEG DATUM)= 2041.63
TOTAL OUTPUT IN DEGREE-GALLONS/KW= 323.761
TOTAL OUTPUT IN DEGREE-GALLONS/KW/SQ.FT= 28.3751

| TIME: | 12:5 | 12:10 | 12:15 | 12:20 | 12:25 | 12:30 | 12:35 | 12:40 | 12:45 | 12:50 | 12:55 | 12:60 |
|---|---|---|---|---|---|---|---|---|---|---|---|---|
| TEMP: | 120 | 119 | 119 | 119 | 118 | 117 | 116 | 116 | 115 | 114 | 113 | 111 |

| TIME: | 13:5 | 13:10 | 13:15 | 13:20 | 13:25 | 13:30 | 13:35 | 13:40 | 13:45 | 13:50 | 13:55 | 13:60 |
|---|---|---|---|---|---|---|---|---|---|---|---|---|
| TEMP: | 110 | 109 | 107 | 105 | 104 | 104 | 102 | 100 | 0 | 0 | 0 | 0 |

DEGREE-GALLONS OUTPUT DATA:

| I | TIME | T(I) | DG(I) | I | TIME | T(I) | DG(I) | I | TIME | T(I) | DG(I) |
|---|---|---|---|---|---|---|---|---|---|---|---|
| 1 | 2:30 | 141 | 477.332 | 2 | 3:40 | 140 | 138.74 | 3 | 4:35 | 139 | 158.797 |
| 4 | 5:25 | 138 | 133.437 | 5 | 6:5 | 137 | 107.828 | 6 | 6:40 | 136 | 92.4833 |
| 7 | 7:15 | 135 | 91.3372 | 8 | 7:45 | 134 | 77.230 | 9 | 8:20 | 133 | 89.9248 |
| 10 | 8:55 | 132 | 87.8687 | 11 | 9:20 | 131 | 61.9373 | 12 | 9:40 | 130 | 48.8833 |
| 13 | 10:0 | 129 | 48.2287 | 14 | 10:20 | 128 | 47.950 | 15 | 10:35 | 127 | 33.1965 |
| 16 | 10:55 | 126 | 46.2467 | 17 | 11:10 | 125 | 34.1895 | 18 | 11:20 | 124 | 22.4627 |
| 19 | 11:30 | 123 | 22.1323 | 20 | 11:45 | 122 | 32.783 | 21 | 11:55 | 121 | 21.4717 |
| 22 | 12:5 | 120 | 21.1413 | 23 | 12:10 | 119 | 18.4653 | 24 | 12:25 | 118 | 38.721 |
| 25 | 12:30 | 117 | 18.8752 | 26 | 12:40 | 116 | 19.82 | 27 | 12:45 | 115 | 9.7443 |
| 28 | 12:50 | 114 | 9.5767 | 29 | 12:55 | 113 | 9.4145 | 30 | 13:0 | 111 | 9.08417 |
| 31 | 13:5 | 110 | 8.919 | 32 | 13:10 | 109 | 8.7533 | 33 | 13:15 | 107 | 8.4233 |
| 34 | 13:20 | 106 | 8.2533 | 35 | 13:30 | 104 | 15.856 | 36 | 13:33 | 102 | 7.99767 |
| 37 | 13:40 | 100 | 7.2673 | 38 | 999:0 | 0 | 0 | 39 | 0:0 | 0 | 0 |

```
MODEL.... SEARS 30G    GPM... 1.982
TOTAL TIME IN SEC.S= 820
TOTAL OUTPUT IN DEGREE/GALLONS (100 DEG DATUM)= 2063.43
TOTAL OUTPUT IN DEGREE-GALLONS/KW= 332.596
TOTAL OUTPUT IN DEGREE-GALLONS/KW/SQ.FT= 20.9312
```

MODEL... SEARS 30G

GPM...... 1.982

```
WATER HEIGHTS, In. ...10 & 8                    TIME..
WATER INLET TEMP. DEG F... 56         TOTAL ELAPSED TIME
TOTAL GALLONS COLLECTED... 27.08        (MIN.S:SEC.S)... 13 : 40
TOTAL EXT. SURFACE AREA (SQ.FT)= 15.89  INPUT AMPS/VOLTS... 15.6 / 246
                                        TOTAL INPUT KW.... 6.204
```

INPUT DATA

| TIME | 0:5 | 0:10 | 0:15 | 0:20 | 0:25 | 0:30 | 0:35 | 0:40 | 0:45 | 0:50 | 0:55 | 0:60 |
|---|---|---|---|---|---|---|---|---|---|---|---|---|
| TEMP | 141 | 141 | 141 | 141 | 141 | 141 | 141 | 141 | 141 | 141 | 141 | 141 |
| TIME | 1:5 | 1:10 | 1:15 | 1:20 | 1:25 | 1:30 | 1:35 | 1:40 | 1:45 | 1:50 | 1:55 | 1:60 |
| TEMP | 141 | 141 | 141 | 141 | 141 | 141 | 141 | 141 | 141 | 141 | 141 | 141 |
| TIME | 2:5 | 2:10 | 2:15 | 2:20 | 2:25 | 2:30 | 2:35 | 2:40 | 2:45 | 2:50 | 2:55 | 2:60 |
| TEMP | 141 | 141 | 141 | 141 | 141 | 141 | 141 | 141 | 141 | 141 | 140 | 140 |
| TIME | 3:5 | 3:10 | 3:15 | 3:20 | 3:25 | 3:30 | 3:35 | 3:40 | 3:45 | 3:50 | 3:55 | 3:60 |
| TEMP | 140 | 140 | 140 | 140 | 140 | 140 | 140 | 140 | 139 | 139 | 139 | 139 |
| TIME | 4:5 | 4:10 | 4:15 | 4:20 | 4:25 | 4:30 | 4:35 | 4:40 | 4:45 | 4:50 | 4:55 | 4:60 |
| TEMP | 139 | 139 | 139 | 139 | 139 | 139 | 139 | 138 | 138 | 138 | 138 | 138 |
| TIME | 5:5 | 5:10 | 5:15 | 5:20 | 5:25 | 5:30 | 5:35 | 5:40 | 5:45 | 5:50 | 5:55 | 5:60 |
| TEMP | 138 | 138 | 138 | 138 | 138 | 137 | 137 | 137 | 137 | 137 | 137 | 137 |
| TIME | 6:5 | 6:10 | 6:15 | 6:20 | 6:25 | 6:30 | 6:35 | 6:40 | 6:45 | 6:50 | 6:55 | 6:60 |
| TEMP | 137 | 136 | 136 | 136 | 136 | 136 | 136 | 136 | 135 | 135 | 135 | 135 |
| TIME | 7:5 | 7:10 | 7:15 | 7:20 | 7:25 | 7:30 | 7:35 | 7:40 | 7:45 | 7:50 | 7:55 | 7:60 |
| TEMP | 135 | 135 | 135 | 134 | 134 | 134 | 134 | 134 | 134 | 133 | 133 | 133 |
| TIME | 8:5 | 8:10 | 8:15 | 8:20 | 8:25 | 8:30 | 8:35 | 8:40 | 8:45 | 8:50 | 8:55 | 9:60 |
| TEMP | 133 | 133 | 133 | 133 | 132 | 132 | 132 | 132 | 132 | 132 | 132 | 131 |
| TIME | 9:5 | 9:10 | 9:15 | 9:20 | 9:25 | 9:30 | 9:35 | 9:40 | 9:45 | 9:50 | 9:55 | 9:60 |
| TEMP | 131 | 131 | 131 | 131 | 130 | 130 | 130 | 130 | 129 | 129 | 129 | 129 |
| TIME | 10:5 | 10:10 | 10:15 | 10:20 | 10:25 | 10:30 | 10:35 | 10:40 | 10:45 | 10:50 | 10:55 | 10:60 |
| TEMP | 128 | 128 | 128 | 128 | 127 | 127 | 127 | 126 | 126 | 126 | 126 | 125 |
| TIME | 11:5 | 11:10 | 11:15 | 11:20 | 11:25 | 11:30 | 11:35 | 11:40 | 11:45 | 11:50 | 11:55 | 11:60 |
| TEMP | 125 | 125 | 124 | 124 | 123 | 123 | 122 | 122 | 122 | 121 | 121 | 120 |

MODEL... SEARS 30G

GPM...... 2.665

```
WATER HEIGHTS, In. ...10 & 7 3/4
WATER INLET TEMP. DEG F... 56         TOTAL ELAPSED TIME
TOTAL GALLONS COLLECTED... 26.665       (MIN.S:SEC.S)... 10 : 0
                                       INPUT AMPS/VOLTS... 15.65 / 242
TOTAL EXT. SURFACE AREA (SQ.FT)= 15.89
                                       TOTAL INPUT KW.... 6.037
```

INPUT DATA

```
TIME: 0:5   0:10  0:15  0:20  0:25  0:30  0:35  0:40  0:45  0:50  0:55  0:60
TEMP: 141   141   141   141   141   141   141   141   141   141   141   141

TIME: 1:5   1:10  1:15  1:20  1:25  1:30  1:35  1:40  1:45  1:50  1:55  1:60
TEMP: 140   140   140   140   140   140   140   140   140   140   140   140

TIME: 2:5   2:10  2:15  2:20  2:25  2:30  2:35  2:40  2:45  2:50  2:55  2:60
TEMP: 140   139   139   139   139   139   139   139   139   139   139   139

TIME: 3:5   3:10  3:15  3:20  3:25  3:30  3:35  3:40  3:45  3:50  3:55  3:60
TEMP: 138   138   138   138   138   138   138   137   137   137   137   137

TIME: 4:5   4:10  4:15  4:20  4:25  4:30  4:35  4:40  4:45  4:50  4:55  4:60
TEMP: 137   137   136   136   136   136   135   135   135   135   135   135

TIME: 5:5   5:10  5:15  5:20  5:25  5:30  5:35  5:40  5:45  5:50  5:55  5:60
TEMP: 135   134   134   134   133   133   133   133   133   132   132   132

TIME: 6:5   6:10  6:15  6:20  6:25  6:30  6:35  6:40  6:45  6:50  6:55  6:60
TEMP: 132   131   131   131   130   130   130   129   129   129   128   128

TIME: 7:5   7:10  7:15  7:20  7:25  7:30  7:35  7:40  7:45  7:50  7:55  7:60
TEMP: 127   127   127   127   126   126   125   125   124   124   123   123

TIME: 8:5   8:10  8:15  8:20  8:25  8:30  8:35  8:40  8:45  8:50  8:55  8:60
TEMP: 122   122   121   121   120   120   119   118   117   117   116   115

TIME: 9:5   9:10  9:15  9:20  9:25  9:30  9:35  9:40  9:45  9:50  9:55  9:60
TEMP: 115   114   112   111   110   109   107   106   105   104   102   100
```

DEGREE-GALLONS OUTPUT DATA:

| I | TIME | T(I) | DG(I) | I | TIME | T(I) | DG(I) | I | TIME | T(I) | DG(I) |
|---|------|------|-------|---|------|------|-------|---|------|------|-------|
| 1 | 1:0 | 141 | 228.925 | 2 | 2:5 | 140 | 242.515 | 3 | 2:55 | 139 | 184.329 |
| 4 | 3:35 | 138 | 145.087 | 5 | 4:10 | 137 | 125.921 | 6 | 4:35 | 136 | 98.8333 |
| 7 | 5:5 | 135 | 105.258 | 8 | 5:20 | 134 | 51.5673 | 9 | 5:45 | 133 | 85.5021 |
| 10 | 6:5 | 132 | 67.3133 | 11 | 6:20 | 131 | 49.9508 | 12 | 6:35 | 130 | 49.3925 |
| 13 | 6:50 | 129 | 44.5353 | 14 | 7:0 | 128 | 31.90 | 15 | 7:20 | 127 | 63.0717 |
| 16 | 7:30 | 126 | 31.0917 | 17 | 7:40 | 125 | 31.6475 | 18 | 7:50 | 124 | 32.2053 |
| 19 | 8:0 | 123 | 28.7592 | 20 | 8:10 | 122 | 29.315 | 21 | 8:20 | 121 | 28.8708 |
| 22 | 8:30 | 120 | 28.4267 | 23 | 8:35 | 119 | 13.9913 | 24 | 8:40 | 118 | 13.7632 |
| 25 | 8:50 | 117 | 27.0042 | 26 | 8:55 | 116 | 13.325 | 27 | 9:0 | 115 | 26.2058 |
| 28 | 9:10 | 114 | 12.8008 | 29 | 9:15 | 112 | 12.4367 | 30 | 9:20 | 111 | 12.2146 |
| 31 | 9:25 | 110 | 11.9925 | 32 | 9:30 | 109 | 11.7704 | 33 | 9:35 | 107 | 11.3263 |
| 34 | 9:40 | 106 | 11.1042 | 35 | 9:45 | 105 | 10.8821 | 36 | 9:50 | 104 | 10.66 |
| 37 | 9:55 | 102 | 10.2158 | 38 | 10:0 | 100 | 9.77167 | 39 | 999:0 | 0 | 0 |

MODEL....SEARS 30G    GPM... 2.665
TOTAL TIME IN SEC.S= 600
TOTAL OUTPUT IN DEGREE/GALLONS (100 DEG DATUM)= 1994.97
TOTAL OUTPUT IN DEGREE-GALLONS/KW= 330.458
TOTAL OUTPUT IN DEGREE-GALLONS/KW/SQ.FT= 20.7966

DEGREE-GALLONS OUTPUT DATA:

| I | TIME | T(I) | DG(I) | I | TIME | T(I) | DG(I) | I | TIME | T(I) | DG(I) |
|---|------|------|-------|---|------|------|-------|---|------|------|-------|
| 1 | 1:35 | 141 | 483.158 | 2 | 2:5 | 140 | 158.78 | 3 | 2:20 | 139 | 74.4925 |
| 4 | 2:50 | 138 | 147.19 | 5 | 3:10 | 137 | 95.93 | 6 | 3:30 | 136 | 95.772 |
| 7 | 3:45 | 135 | 78.9825 | 8 | 4:10 | 134 | 116.675 | 9 | 4:25 | 133 | 69.1875 |
| 10 | 4:35 | 132 | 45.4733 | 11 | 4:50 | 131 | 67.3125 | 12 | 5:5 | 130 | 66.415 |
| 13 | 5:15 | 129 | 43.6783 | 14 | 5:25 | 128 | 43.08 | 15 | 5:35 | 127 | 42.4817 |
| 16 | 5:40 | 126 | 20.9417 | 17 | 5:50 | 125 | 41.285 | 18 | 5:55 | 124 | 20.3425 |
| 19 | 6:0 | 123 | 20.0442 | 20 | 6:10 | 122 | 39.49 | 21 | 6:15 | 121 | 19.4458 |
| 22 | 6:20 | 120 | 19.1467 | 23 | 6:25 | 119 | 18.8475 | 24 | 6:30 | 117 | 18.2492 |
| 25 | 6:35 | 116 | 17.95 | 26 | 6:40 | 114 | 17.3517 | 27 | 6:45 | 112 | 16.7533 |
| 28 | 6:50 | 110 | 16.155 | 29 | 6:55 | 108 | 15.5567 | 30 | 7:0 | 106 | 14.9583 |
| 31 | 7:5 | 103 | 14.0608 | 32 | 7:10 | 100 | 13.1633 | 33 | 999:0 | 0 | 0 |

```
MODEL....SEARS 30G    GPM... 3.59
TOTAL TIME IN SEC.S= 430
TOTAL OUTPUT IN DEGREE/GALLONS (100 DEG DATUM)= 1957.15
TOTAL OUTPUT IN DEGREE-GALLONS/KW= 331.327
TOTAL OUTPUT IN DEGREE-GALLONS/KW/SQ.FT= 20.8513
PERCENTAGE OF CAPACITY DELIVERED= .857667
```

MODEL... SEARS 30G

GPM...... 3.59

```
WATER HEIGHTS, In.....9 1/4 & 8          TOTAL ELAPSED TIME
WATER INLET TEMP. DEG F... 56              (MIN.S:SEC.S)... 7 : 10
TOTAL GALLONS COLLECTED... 25.73         INPUT AMPS/VOLTS... 15.6 / 249
TOTAL EXT. SURFACE AREA (SQ.FT)= 15.89   TOTAL INPUT KW.... 5.907
```

INPUT DATA

| TIME: | 0:5 | 0:10 | 0:15 | 0:20 | 0:25 | 0:30 | 0:35 | 0:40 | 0:45 | 0:50 | 0:55 | 0:60 |
|---|---|---|---|---|---|---|---|---|---|---|---|---|
| TEMP: | 141 | 141 | 141 | 141 | 141 | 141 | 141 | 141 | 141 | 141 | 141 | 141 |
| TIME: | 1:5 | 1:10 | 1:15 | 1:20 | 1:25 | 1:30 | 1:35 | 1:40 | 1:45 | 1:50 | 1:55 | 1:60 |
| TEMP: | 141 | 141 | 141 | 141 | 141 | 141 | 141 | 140 | 140 | 140 | 140 | 140 |
| TIME: | 2:5 | 2:10 | 2:15 | 2:20 | 2:25 | 2:30 | 2:35 | 2:40 | 2:45 | 2:50 | 2:55 | 2:60 |
| TEMP: | 140 | 139 | 139 | 139 | 139 | 138 | 138 | 138 | 138 | 138 | 137 | 137 |
| TIME: | 3:5 | 3:10 | 3:15 | 3:20 | 3:25 | 3:30 | 3:35 | 3:40 | 3:45 | 3:50 | 3:55 | 3:60 |
| TEMP: | 137 | 137 | 136 | 136 | 136 | 136 | 135 | 135 | 135 | 134 | 134 | 134 |
| TIME: | 4:5 | 4:10 | 4:15 | 4:20 | 4:25 | 4:30 | 4:35 | 4:40 | 4:45 | 4:50 | 4:55 | 4:60 |
| TEMP: | 134 | 134 | 133 | 133 | 133 | 132 | 132 | 131 | 131 | 131 | 130 | 130 |
| TIME: | 5:5 | 5:10 | 5:15 | 5:20 | 5:25 | 5:30 | 5:35 | 5:40 | 5:45 | 5:50 | 5:55 | 5:60 |
| TEMP: | 130 | 129 | 129 | 128 | 128 | 127 | 127 | 126 | 126 | 126 | 124 | 122 |
| TIME: | 6:5 | 6:10 | 6:15 | 6:20 | 6:25 | 6:30 | 6:35 | 6:40 | 6:45 | 6:50 | 6:55 | 6:60 |
| TEMP: | 122 | 122 | 121 | 120 | 119 | 117 | 116 | 114 | 112 | 110 | 108 | 106 |
| TIME: | 7:5 | 7:10 | 7:15 | 7:20 | 7:25 | 7:30 | 7:35 | 7:40 | 7:45 | 7:50 | 7:55 | 7:60 |
| TEMP: | 105 | 100 | 0 | 0 | 0 | 0 | 0 | 0 | 0 | 0 | 0 | 0 |

MODEL... SEARS 30G

GPM...... 4

```
WATER HEIGHTS, In. ...9 & 8 1/4          TOTAL ELAPSED TIME
WATER INLET TEMP. DEG F... 55              (MIN.S:SEC.S)... 6 : 25
TOTAL GALLONS COLLECTED... 25.71         INPUT AMPS/VOLTS... 15.6 / 249
TOTAL EXT. SURFACE AREA (SQ.FT)= 15.89   TOTAL INPUT KW.... 5.869
```

INPUT DATA

| TIME: | 0:5 | 0:10 | 0:15 | 0:20 | 0:25 | 0:30 | 0:35 | 0:40 | 0:45 | 0:50 | 0:55 | 0:60 |
|---|---|---|---|---|---|---|---|---|---|---|---|---|
| TEMP: | 141 | 141 | 141 | 141 | 141 | 141 | 141 | 141 | 141 | 141 | 141 | 141 |
| TIME: | 1:5 | 1:10 | 1:15 | 1:20 | 1:25 | 1:30 | 1:35 | 1:40 | 1:45 | 1:50 | 1:55 | 1:60 |
| TEMP: | 141 | 141 | 141 | 140 | 140 | 140 | 140 | 140 | 139 | 139 | 139 | 139 |
| TIME: | 2:5 | 2:10 | 2:15 | 2:20 | 2:25 | 2:30 | 2:35 | 2:40 | 2:45 | 2:50 | 2:55 | 2:60 |
| TEMP: | 138 | 138 | 138 | 138 | 138 | 138 | 137 | 137 | 137 | 136 | 136 | 136 |
| TIME: | 3:5 | 3:10 | 3:15 | 3:20 | 3:25 | 3:30 | 3:35 | 3:40 | 3:45 | 3:50 | 3:55 | 3:60 |

```
TEMP:  136   133   133   133   133   134   134   133   132   132   132   131

TIME:  4:5   4:10  4:15  4:20  4:25  4:30  4:35  4:40  4:45  4:50  4:55  4:60
TEMP:  131   130   130   130   129   129   129   128   128   127   126   125

TIME:  5:5   5:10  5:15  5:20  5:25  5:30  5:35  5:40  5:45  5:50  5:55  5:60
TEMP:  124   124   123   122   121   120   119   118   116   115   114   113

TIME:  6:5   6:10  6:15  6:20  6:25  6:30  6:35  6:40  6:45  6:50  6:55  6:60
TEMP:  110   108   103   102   100    0     0     0     0     0     0     0
```

DEGREE-GALLONS OUTPUT DATA:

| I | TIME | T(I) | DG(I) | I | TIME | T(I) | DG(I) | I | TIME | T(I) | DG(I) |
|---|------|------|-------|---|------|------|-------|---|------|------|-------|
| 1 | 1:15 | 141 | 438 | 2 | 1:40 | 140 | 141.667 | 3 | 2:0 | 139 | 112 |
| 4 | 2:30 | 138 | 166 | 5 | 2:45 | 137 | 82 | 6 | 3:5 | 136 | 100 |
| 7 | 3:25 | 135 | 106.667 | 8 | 3:33 | 134 | 32.6667 | 9 | 3:40 | 133 | 26 |
| 10 | 3:55 | 132 | 77 | 11 | 4:5 | 131 | 58.6667 | 12 | 4:20 | 130 | 73 |
| 13 | 4:35 | 129 | 74 | 14 | 4:45 | 128 | 48.6667 | 15 | 4:50 | 127 | 24 |
| 16 | 4:55 | 126 | 23.6667 | 17 | 5:0 | 125 | 23.3333 | 18 | 5:10 | 124 | 46 |
| 19 | 5:15 | 123 | 22.6667 | 20 | 5:20 | 122 | 22.3333 | 21 | 5:25 | 121 | 22 |
| 22 | 5:30 | 120 | 21.6667 | 23 | 5:35 | 119 | 21.3333 | 24 | 5:40 | 118 | 21 |
| 25 | 5:45 | 116 | 20.3333 | 26 | 5:50 | 115 | 20 | 27 | 5:55 | 114 | 19.6667 |
| 28 | 6:0 | 103 | 18 | 29 | 6:5 | 110 | 18.3333 | 30 | 6:10 | 108 | 17.6667 |
| 31 | 6:15 | 105 | 16.6667 | 32 | 6:20 | 102 | 15.6667 | 33 | 6:25 | 100 | 15 |

MODEL....SEARS 30G    GPM... 4
TOTAL TIME IN SEC. S= 385
TOTAL OUTPUT IN DEGREE/GALLONS (100 DEG DATUM)= 1957.67
TOTAL OUTPUT IN DEGREE-GALLONS/KW= 333.56
TOTAL OUTPUT IN DEGREE-GALLONS/KW/SQ.FT= 20.9918

A water stratification test was then performed on the test heater of the present invention, described above as similar to that shown in FIG. 14. Six thermocouples were secured to the heater, one for each compartment secured to
5  the metal side heater wall opposite each heating element under the insulation. Six thermocouples were also installed on the Sears 30 gallon heater under the insulation in the same relative positions, heightwise. The thermocouples were numbered 1-6 with No. 1 being at the outlet and No. 6 at the inlet.
10  The following data were collected:

MODEL:        (COMPARTMENTALIZED)   VOLTS: 245   AMPS: 15.00   AMB: 62F

| Time | *9:20 | 9:30 | 9:40 | 9:50 | *10:00 | 10:10 | 10:30 | 11:00 | 11:30 | 12:00 |
|------|-------|------|------|------|--------|-------|-------|-------|-------|-------|
| T/C#1 | 79 | 94 | 115 | 136 | 153 | 151 | 149 | 145 | 142 | 138 |
| T/C#2 | 77 | 90 | 107 | 123 | 138 | 136 | 134 | 134 | 133 | 132 |
| T/C#3 | 75 | 88 | 102 | 118 | 131 | 130 | 128 | 128 | 127 | 126 |
| T/C#4 | 75 | 88 | 103 | 116 | 128 | 127 | 125 | 125 | 127 | 123 |
| T/C#5 | 75 | 87 | 99 | 112 | 121 | 121 | 120 | 118 | 116 | 115 |
| T/C#6 | 71 | 81 | 93 | 104 | 112 | 108 | 104 | 101 | 99 | 98 |

| Time | 12:30 | 1:00 | 1:30 | 2:00 | |
|---|---|---|---|---|---|
| T/C#1 | 135 | 132 | 130 | 128 | *Heater On at 9:20 |
| T/C#2 | 131 | 130 | 129 | 128 | **Heater Off at 10:00 |
| T/C#3 | 125 | 124 | 123 | 124 | |
| T/C#4 | 121 | 120 | 120 | 120 | |
| T/C#5 | 115 | 113 | 112 | 111 | |
| T/C#6 | 97 | 96 | 95 | 94 | |

MODEL: SEARS 30G   VOLTS:248   AMPS: 15.6   AMBIENT 62 DEG F

| Time | *7:35 | 8:00 | 8:30 | 9:00 | 9:30 | 10:00 | 10:30 | 11:00 |
|---|---|---|---|---|---|---|---|---|
| T/C#1 | 140 | 140 | 139 | 138 | 138 | 137 | 137 | 136 |
| T/C#2 | 142 | 142 | 140 | 140 | 140 | 138 | 138 | 137 |
| T/C#3 | 142 | 140 | 139 | 138 | 138 | 137 | 137 | 136 |
| T/C#4 | 140 | 140 | 139 | 138 | 138 | 137 | 137 | 136 |
| T/C#5 | 140 | 140 | 139 | 138 | 137 | 136 | 135 | 134 |
| T/C#6 | 124 | 122 | 117 | 115 | 114 | 114 | 113 | 113 |

*Heater Off at 7:35

A summary of the data is set forth below:

SUMMARY DATA:

MODEL :CMPRT1   ( 15 GALLON CAPACITY)

| | | | | | | | |
|---|---|---|---|---|---|---|---|
| GPM(1) | 0.751 | 1.297 | 1.67 | 2.43 | 2.77 | 3.564 | 4.21 |
| DG-DLN(2) | 1337 | 1256 | 1152 | 1070 | 1056 | 1088 | 1000 |
| DG/KW(3) | 338.9 | 347.3 | 353.9 | 335.4 | 334.3 | 354 | 330 |
| DG/KW/SQFT(4) | 25.67 | 26.53 | 26.8 | 25.41 | 25.32 | 26.86 | 25 |
| Total Gallons Collected | 17.33 | 16.1 | 15.3 | 14.4 | 14.55 | 14.85 | 13.2 |
| % of capacity delivered | 1.15 | 1.07 | 1.02 | 0.96 | 0.97 | 0.99 | 0.88 |

---

MODEL: SEARS 30G   (30 GALLON CAPACITY)

| | | | | | |
|---|---|---|---|---|---|
| GPM(1) | 1.053 | 1.54 | 1.982 | 2.665 | 3.59 |
| DG-GLN(2) | 1985 | 2042 | 2063 | 1994 | 1953 |
| DG/KW(3) | 289 | 323.7 | 332 | 330 | 331.3 |
| DG/KW/SQFT(4) | 18.19 | 20.37 | 20.93 | 20.76 | 20.8 |
| Total Gallons Collected | 24.56 | 26.23 | 27.08 | 26.665 | 25.73 |

| % of capacity delivered | 0.82 | 0.87 | 0.90 | 0.89 | 0.86 |
|---|---|---|---|---|---|

(1) GPM- Gallons per minute
(2) DG-GLN- Degree-gallons
(3) DG/KW- Degree-gallons per KW of input
(4) DG/KW/SQFT- Degree-gallons per KW of input, per square foot of external tank area These results would have shown a more dramatic effect if the heater made in accordance with the present invention were insulated to the same degree as the comparison Sears heater. The Sears tank employed 1½ inch thick commercially and well applied foam insulation. the compartmentalized sample heater employed ½ in. fiberglass sheet insulation. Further, it is believed that a cylindrical heater, as shown in FIG. 15, would lose less heat to the atmosphere due to less surface area/volume. It is clear, however, that the heater of the present invention provides more degree gallons per kilowatt (KW) input and the compartments provide new and unexpected temperature stratification. Particularly, unexpected results are provided in terms of degree-gallons per KW input, per square foot of external surface area.

Figure 22:
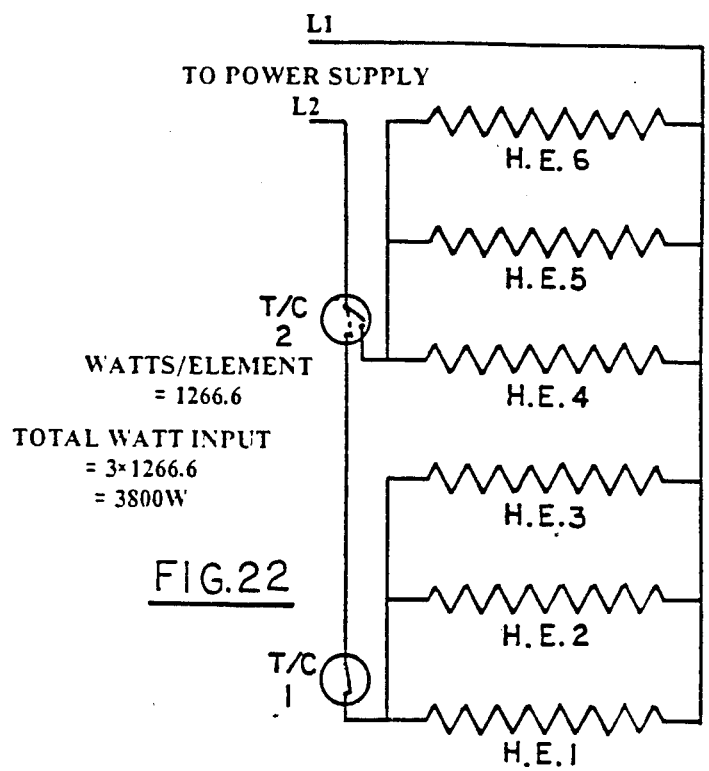
FIGS. 22-24 show, schematically, thermostatic control of heating elements suitable for any of the heaters of FIGS. 1-6 and 8-21.
Figure 23:
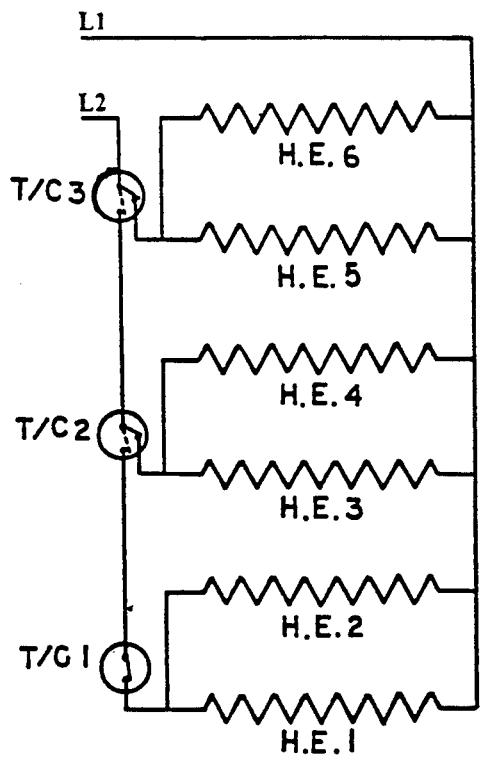
Figure 24:
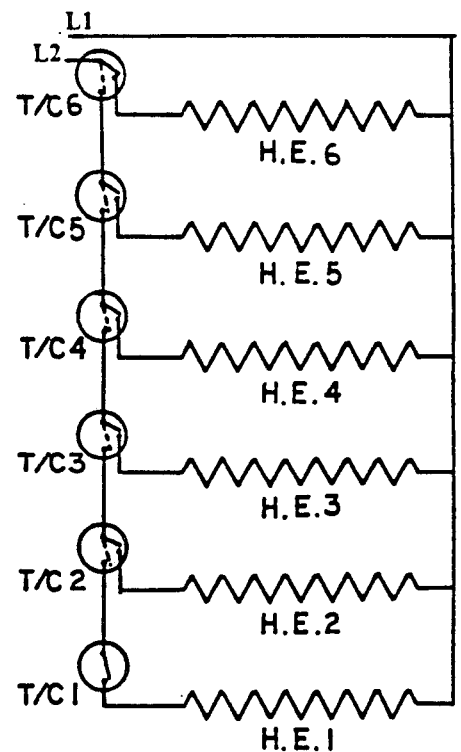

FIGS. 22 through 24 illustrate some typical wiring diagrams that can be implemented on all embodiments of the compartmentalized heater of FIGS. 1–21. In these diagrams, H.E. is an abbreviation for heating element and heating elements are disposed in the first or most upstream compartment and heating element 6 disposed in the outlet, or most downstream compartment. It is understood that heating elements are not necessary in all compartments, but should be provided in most compartments to achieve an energy shifting, as will be described hereinafter. It should be noted that FIGS. 22 through 24 show different wiring diagrams for the same maximum watt rating of the heater. As an example, 3800 watts total energy input is chosen as an exemplary maximum watt input possible and the heater has six compartments.

Referring now to FIG. 22, the total watt rating of 3800 watts is divided in three elements, either elements 1, 2 and 3 or elements 4, 5 and 6, of equal rating each element being 1266.66 wats. Each of the two groups of elements operates separately and includes three heating elements. As cold water enters the first compartment of any of the heaters of FIGS. 1–21, using the control circuit of FIG. 22, the thermostat 1 (T/C1) disposed in the first compartment closes, thereby energizing the heating elements located in compartments 1, 2 and 3. The cold incoming water increases in temperature in each of the first three compartments. When this heated water enters the fourth compartment, if it is not heated to a predetermined design temperature by then, e.g., 140° F., then the second thermostat (T/C2) is closed. The second thermostat (T/C2) preferably is disposed in the fourth compartment but may be located in any of the downstream compartments 4, 5 or 6. When thermostat 2 closes, elements in compartments 4, 5 and 6 are energized and, simultaneously, heating elements 1, 2 and 3 in compartments 1, 2 and 3, respectively, are deenergized. Thus, the total watt input to the heater is shifted from a lower half of the compartments (compartments 1, 2 and 3) to an upper half of the compartments (compartments 4, 5 and 6). Alternatively, instead of complete on-off shifting, only a portion of the energy can be shifted from the lower half of the compartments to an upper half of the compartments. In this manner, the same mass of water that was partially heated in the upstream first three compartments, by imparting maximum watt energy thereto, is heated again by imparting the maximum watt energy thereto in compartments 4, 5 and 6. Turning now to FIG. 23, the heating elements are controlled by three thermostats, each thermostat controlling a group of two heating elements. Each element in a group has an equal rating of 1900 watts. Similar to FIG. 22, here the same mass of water is heated repeatedly using the maximum watt energy except that using the control circuit of FIG. 23, the water is serially heated in three stages instead of two. Unlike FIG. 22, the maximum watt energy is shifted twice. Again, similar to FIG. 22, only a portion of the watt energy may be shifted. The advantage of the control circuit of FIG. 23 over FIG. 22 is that in FIG. 23 a higher temperature rise can be achieved for a smaller quantity of water, all other things remaining the same.

Turning now to FIG. 24, six elements are used each rated at 3800 watts, each energized separately. Here, like before, the same mass of water is heated repeatedly except it is done in six stages. The maximum watt energy is shifted upwardly (downstream) five times if required to obtain the desired temperature rise. Again, as in the circuit of FIGS. 22 and 23, only a portion of the watt energy may be shifted upwardly as the water progresses upwardly through the compartment. The advantage of the control circuit of FIG. 24 over the circuits of FIGS. 22 and 23 is that a still higher temperature rise can be achieved for a relatively smaller quantity of water, under similar conditions.

It should be noted that if the incoming cold water reaches the desired temperature before reaching the final compartment(s), then the heating elements in those compartments will not be energized and the elements in the preceding compartments where the water has not achieved full temperature rise will stay energized.

In FIG. 22 through 24, when the water flow stops, the reverse energy shifting takes place. The element(s) in the upper downstream compartment(s) stay energized until those compartment(s) reach the desired temperature. The energy is then shifted to the lower upstream compartments, i.e., compartments towards the water inlet, until the water in those compartment(s) reaches the desired temperature. The process continues until the whole tank capacity is heated to the desired temperature.

FIGS. 22–24 show several thermostats in the circuits. However, they may be replaced by a single master thermostat with a plurality of sensing elements.

As is evident from the above, by shifting the total watt input to a specific compartment or compartments, the recovery time is substantially reduced at a minimum of energy input.

The heaters of the present invention are, as made clear from the above description, storage tank-type liquid heaters for domestic and industrial use. Unlike space heating boilers and instantaneous liquid heaters, these heaters have a relatively large standing gallon capacity and small kilowatt heat input. As an example, Canadian Pat. No. 582,580 to Jackson describes a heater with a standing gallon capacity of less than five and a kilowatt input of thirty. Whereas, these heaters generally have a liquid capacity of at least 10 gallons with electrical energy input generally less than about 2 kilowatts/gallon at any one time while achieving sufficient energy input to maintain a substantial volume of water at a predetermined delivery temperature, e.g., 140° F. This low energy input is possible because of the partitions.

It should be understood that the present disclosure has been made only by way of preferred embodiment and that numerous changes in details of construction, combination and arrangement of parts may be resorted to without departing from the spirit and scope of the invention as herein under claimed.

What is claimed and sought to be secured by Letters Patent of the United States is:

1. A compartmentalized, storage-tank-type, electric heater for heating liquids, having a reduced recovery time, comprising:
   a housing;
   a plurality of partition panels wholly disposed within the housing to form a plurality of compartments, each partition having flow passage means for fluid communication with only the immediately adjacent compartment(s);
   said flow passage means disposed wholly within the housing;
   a fluid inlet in a first upstream compartment disposed within the housing;
   a fluid outlet in a final downstream compartment disposed within the housing;
   heating means in the housing for heating fluid in at least some of the compartments;
   automatic thermostatic control(s) to maintain the fluid temperature; and,
   said automatic thermostatic control(s) electrically wired to shift heating output from at least one compartment to at least one other compartment, said automatic thermostatic control(s) progressively shifting heating output from upstream compartments to downstream compartments during withdrawal of fluid and progressively shifting heating output from downstream compartments to upstream compartments when fluid withdrawal stops so that all of the heating means are not energized simultaneously thereby limiting maximum energy usage to a preselected amount.

2. The heater of claim 1 wherein said housing is suitably enclosed in a layer of thermal insulation to reduce stand-by thermal losses and the partition panels are thermally insulated to induce a high degree of temperature stratification and to enhance inhibition of mixing of cold hot liquid.

3. The heater of claim 1 wherein the compartments are disposed to interconnect serially to form a serpentine path, and to provide liquid flow reversal from one comparment to another through sharp turns to create turbulence, thereby enhancing heat transfer from the heating means to flowing liquid.

4. The heater of claim 1 wherein the partition panels are structurally weaker than the housing.

5. The heater of claim 1 wherein the partition panels are secured within the housing substantially by friction or force fit.

6. The heater of claim 1 wherein said compartments in fluid communication form a spiral ramp extending from the inlet to the outlet.

7. The heater of claim 1 wherein said partition panels are made of plate material having a thickness less than 0.050 inch.

8. The heater of claim 1 wherein the partition panels are non-integral members of the housing.

* * * * *